United States Patent
Tanner et al.

(10) Patent No.: US 7,103,873 B2
(45) Date of Patent: Sep. 5, 2006

(54) SYSTEM AND METHOD FOR LEVERAGING INDEPENDENT INNOVATION IN ENTERTAINMENT CONTENT AND GRAPHICS HARDWARE

(75) Inventors: Christopher C. Tanner, Cupertino, CA (US); Remi Simon Vincent Arnaud, San Jose, CA (US); Michael T. Jones, San Jose, CA (US); Richard D. Webb, Redwood City, CA (US); Brian McClendon, Portola Valley, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 604 days.

(21) Appl. No.: 09/779,453

(22) Filed: Feb. 9, 2001

(65) Prior Publication Data

US 2002/0038451 A1    Mar. 28, 2002

Related U.S. Application Data

(60) Provisional application No. 60/223,547, filed on Aug. 4, 2000.

(51) Int. Cl.
*G06F 9/44* (2006.01)
*G06F 9/46* (2006.01)

(52) U.S. Cl. .................. 717/109; 717/116; 718/102

(58) Field of Classification Search ........... 717/101, 717/104, 107–109, 116, 117, 139; 718/102, 718/104
See application file for complete search history.

(56) References Cited

U.S. PATENT DOCUMENTS 5,815,415 A * 9/1998 Bentley et al. ............. 703/4
5,857,106 A * 1/1999 Barbour et al. ............ 717/138
5,999,728 A * 12/1999 Cable ........................ 717/105

(Continued)

FOREIGN PATENT DOCUMENTS

EP    0 722 140 A1    7/1996

(Continued)

OTHER PUBLICATIONS

Fuchs, M: "Using Scoping Rules as a Distributed Coordination Language," *System Sciences, 1997, Proceedings of the Thirteenth Hawaii International Conference on Wailea, HI*, USA Jan. 7-10, 1997, Los Alamitos, CA, USA, IEEE Comput. Soc, US, Jan. 7, 1997, pp. 340-348.

(Continued)

*Primary Examiner*—Tuan Dam
*Assistant Examiner*—Michael Yigdall
(74) *Attorney, Agent, or Firm*—Christie, Parker & Hale LLP

(57) ABSTRACT

A method for supporting development of content independent of a run time platform is provided. A method includes storing processing blocks and storing an application graph that expresses the identity of the stored processing blocks and data connectivity therebetween. The application graph can be traversed by a graphical application platform at run time to execute appropriate blocks. A game development and run time system includes a graphical application platform that enables a game application to run on any of multiple hardware platforms. The graphical application platform has an application real time kernel, a plurality of standard features implemented as executable blocks of logic, and connections between blocks that implement data flow between the blocks. Capabilities of the game application and any of the hardware platforms can be implemented modularly by adding additional corresponding blocks and connections.

12 Claims, 23 Drawing Sheets

U.S. PATENT DOCUMENTS

| | | | |
|---|---|---|---|
| 5,999,729 A * | 12/1999 | Tabloski et al. | 717/105 |
| 6,052,527 A * | 4/2000 | Delcourt et al. | 717/138 |
| 6,502,238 B1 * | 12/2002 | Pavan et al. | 717/149 |
| 6,578,197 B1 * | 6/2003 | Peercy et al. | 717/141 |
| 6,584,489 B1 * | 6/2003 | Jones et al. | 718/102 |
| 6,823,299 B1 * | 11/2004 | Contreras et al. | 703/14 |

OTHER PUBLICATIONS

International Search report for International Application No. PCT/US00/32160, International Filing Date: Nov. 28, 2000.

* cited by examiner

SYSTEM AND METHOD FOR LEVERAGING INDEPENDENT INNOVATION IN ENTERTAINMENT CONTENT AND GRAPHICS HARDWARE

This application claims the benefit of U.S. Provisional Application No. 60/223,547, filed Aug. 4, 2000 (incorporated in its entirety herein by reference), and International Application No. PCT/US00/32160, filed Nov. 28, 2000 (also incorporated in its entirety herein by reference).

BACKGROUND OF THE INVENTION

1. Field of the Invention

The invention relates to computer graphics, and more particularly to development of graphics hardware and software.

2. Related Art

Early Graphics Systems

Early visual systems, such as 1954's DX-50 helicopter trainer from Giravion-Dorand, used optical and mechanical systems and did not make a distinction between the database, the visual system, and the display system. The hardware-centric structure of these systems follows from the ambitious nature of their real-time performance and image quality goals relative to available hardware technology of the day. The birth of image generator technology began with Ivan Sutherland's SKETCHPAD system. The CT3, introduced ten years later by Evans & Sutherland, shaped image generator architectures still in use today. This system, first delivered to NASA, was composed of a DIGITAL EQUIPMENT CORPORATION PDP-11 front-end processor running the software, connected to non-programmable graphics hardware. A lasting innovation of this system was separating the database from the visual system, introducing a modeling tool that ran on a PDP-11/40 equipped with a calligraphic display. The CT3 was capable of 900 polygons at 25 Hz, with edge antialiasing and Gouraud shading, and defined the image generator as a database-driven system, connected to a simulation host via a hardware or software interface, with output to one or more associated display subsystems. Such a system is shown in FIG. 1. An image generator 102 is shown creating an image on the basis of data from database 104. The image is then displayed on one or more displays 106.

Scene Graph Toolkits

Since the early 1990's, general-purpose workstations have increasingly competed with dedicated hardware image generators, using sophisticated software, such as the SILICON GRAPHICS, INC. (SGI) IRIS PERFORMER, to implement real-time image generation features. For example, a scene graph was used as a graphics abstraction. A scene graph is a high-level scene and rendering description language. A scene graph is used as part of a toolkit application programming interface (API). The notion of a scene graph underlies PERFORMER and similar products, where it represents the visual database, serves as the arena of action, and is the attachment point for newly developed extensions. PERFORMER uses the scene graph abstraction to provide flexibility to application developers while retaining control of hardware- and performance-related issues. It also introduced a sample application which proved popular as a starting point for developers. PERFORMER was not the first use of scene graphs in a general-purpose graphics toolkit. PERFORMER, however, focused on performance concerns rather than developer convenience or hardware independence.

Outside the circle of IRIS PERFORMER users a common belief is that intermediate software layers degrade the performance of an application. For instance, the game industry's historical perception has been that toolkits are only for prototyping, and that applications must be rewritten before deployment. In contrast to this view, IRIS PERFORMER and PARADIGM ENTERTAINMENT's VISKIT show that an intelligent, optimizing software layer can consistently improve application performance.

The Fourth Element

The success of IRIS PERFORMER in the visual simulation industry popularized the notion of a toolkit-level API more abstract than low-level interfaces like OPENGL, yet less rigid than the interface control definition of classic image generators. This led to the introduction of a fourth element into the structure of an image generator—the visual simulation run-time—the high-level software which provided the additional features, beyond a scene graph, required to recreate the turnkey capability of classic image generators. This is shown in FIG. 2. Here, information in a database 202 is used by run-time software 204. The resulting data is used by a graphics workstation 206 to create an image for display on one or more display devices 208.

Examples of such a system include AECHELON's C-NOVA, RAYTHEON's RIGHTVIEW, THOMSON's SPACE MAGIC, the EQUIPE SIMULATION REAL TIME, MULTIGEN-PARADIGM's VEGA, and, WORMALD's WIGS, each layered above IRIS. Pairing the scene graph API and image generation run-time has improved visual simulation: decreasing risk, schedule, and cost. Developers can add features without relying on sole-source vendor enhancements, helping integrators use and retain proprietary techniques in system configurations, and better matching the power of commercial graphics hardware to needs of the image generation community.

However, advances of software technology can lead to the discovery of new barriers. This is true with the scene graph as well, where developers consistently encounter the same technical problems:

Weak Extension Model. The scene graph is a good structure for expressing hierarchical articulations, BSP definitions, level of detail (LOD) switch ranges, and similar traversal characteristics. When extended to allow application developers to attach callback functions or redefine scene graph elements, however, a problem emerges. This "tree decoration" metaphor converts a scene graph into an expression tree with critical but unstated order dependencies, surreptitiously changing the meaning of scene graph traversal with the result that any two or more extensions are likely to be incompatible.

Limited Code Reuse. It is difficult if not impossible for separate developers to build independent features that can be merged into the common scene graph due to extension model semantic conflicts. This leads integrators to develop their own visual simulation run-time environments since they lack a framework for integrating sub-components from independent software providers, resulting in multiple versions of the same base features. This troubles technical evaluators, who may know that a machine is capable of a feature, but cannot know if a particular bidder will implement it as desired—and there is no way to replace a weak implementation in one program with a strong implementation from another.

Difficulties in Integration. Even though the last 20% of the integration task seemingly requires 80% of the time and expense, there are few tools to help. Scene graphs are partially responsible, as extension model problems surface at integration time (when different sub-components first operate together) and developers cannot profile, understand, or modify the inner-workings of the scene graph. If testing reveals that a simulator "almost always" runs at frame rate, the developer is typically at a loss to know what the scene graph is doing differently to cause frame extension.

Duplication of Application State. The simulation application computes or manages the positions of objects, light sources, and other state elements. This same information must also appear in the scene graph in an opaque form due to its autonomous nature, which requires duplication of application state between the two with problems in synchronization and updating.

The scene graph is a victim of its own success: it works so well as a graphics abstraction that it has been pressed into further service as an application abstraction, which it is not. These problems are signs of an inherent structural mismatch rather than a flaw of scene graph implementations. An entirely different abstraction and corresponding data structure are needed, able to represent the innermost essence of applications. A new type of real-time graphics software is necessary, one that complements the scene graph as a higher-level counterpart for application-level concepts and concerns.

A new factor adds unprecedented urgency to these issues: lower-cost 3D graphics hardware devices have the features, quality, and performance to serve in an image generator but the corresponding software does not. In many cases, next-generation hardware offers more capability than is required for typical training applications. This does not mean, however, that building applications is becoming easier or less expensive. It will likely be harder to build an image generator from these components than from workstations, just as some integrators have found powerful general-purpose workstations more difficult to master than classic dedicated image generators before the advent of the vendor-tuned IRIS Performer API. The inventors recognized that embracing this era of astounding performance at low price-points requires addressing the portability of high-technology graphics application software, which in turn means considering applications as mobile components able to move from one hardware system to another. Software is needed that promotes distinguishing hardware capabilities by allowing hardware vendors to provide alternate implementations of standard features as a route to tuning and delivering applications.

FIGS. 3A and 3B illustrate the problem of developing game software in a manner that utilizes the features of different hardware platforms with different features. FIG. 3A illustrates a layered approach 300 to game development, where the approach requires customization to a SONY PLAYSTATION 2 platform 310. Game software 320 is tailored to take advantage of the features of platform 310. Game content 330 is adapted to meet the requirements of game software 320. Development tools 340 necessarily affect the game content 330 produced with them. FIG. 3B illustrates a similarly layered approach to game development, customized to a personal computer (PC) platform 360. As above, game software 370 is tailored to take advantage of the features of platform 360. Game content 380 is adapted to meet the requirements of game software 370. Development tools 390 necessarily affect the game content 380 produced with them. In general, a degree of customization is necessary, as suggested by the uneven boundary between hardware and game software. Moreover, this phenomenon of necessary customization tends to extend into the upper layers, as illustrated. The boundary between game software and game content is also necessarily customized; likewise, the boundary between game content and the development tools.

FIG. 4 shows an example of the development of game content. This figure shows the incorporation of various aspects of producing content 405, such as the introduction of sound 410, models 415, animation 420, and behaviors 430, through the use of a level editor 440.

An fundamentally different approach is therefore needed, relative to prior efforts, given that such prior efforts used the same underlying implementation for features and placed the "seam" between system-dependent implementations at the lower level hardware interface and scene graph APIs. These low-level approaches have an inherent weakness, as evidenced by portable 3D graphics benchmark suites. Low-level extension mechanisms restrain hardware vendors from optimizing portable applications, for instance by making it impossible to transparently insert multi-processing. They also tend to stifle innovation by requiring implementation of high-level designs using the specific approach sanctioned by the low-level API developer.

It is even difficult for hardware vendors to add new features using OpenGL's respected extension mechanism, and after having done so, application developers must be enticed to rewrite and re-release their products to incorporate these system-dependent extensions. A new software architecture is needed to address this problem by providing a higher level of abstraction that offers hardware vendors a mechanism to change the way existing, compiled application software implements features, to access the differentiations of their hardware.

SUMMARY OF THE INVENTION

Faced with these concerns, an approach is presented that is able to address these issues in concert, and in so doing, expand the horizon of real-time image generation throughout the application areas of computer graphics, including but not limited to games, training, networked visualization, and other areas where computer graphics are used. This new technology, described in the following sections, is based on the concepts of the software platform and the application framework. These ideas replace the current image generation run-time application with a new framework defining the connectivity, features, and behavior necessary to implement a graphics system. All this takes place in the context of a software platform utilizing an integration mechanism that dynamically integrates the various real-time components in a run-time application. Ultimately displacing hardware as the central focus of development efforts, this software platform functionally is the graphics application, at least as viewed by the simulation host computer, database developers, and those responsible for visual system procurement and maintenance.

An innovative software architecture, the Graphical Application Platform (GAP) is presented. In one embodiment, the GAP includes an application real-time kernel (ARK) and components containing executable blocks of logic. The GAP builds on image generator, workstation, and scene graph success by extending the concepts of platform and framework into the real-time graphics domain—bridging the gap between image generation concerns and contemporary hardware and software realities by decoupling content, hardware and applications. This new approach also provides technology to address emerging concerns related to the selection and acquisition processes in the context of new low-cost, high-performance graphics hardware.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
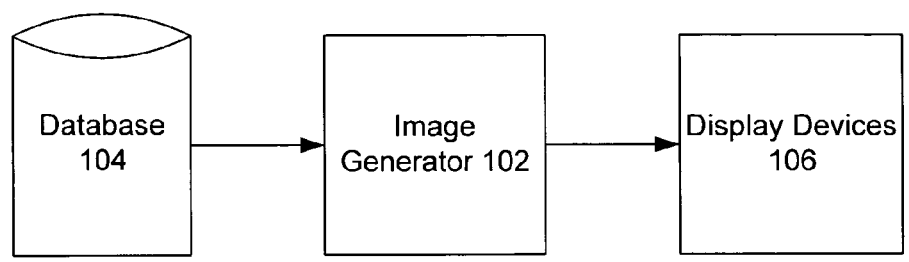
FIG. 1 illustrates the elements of conventional image generation.
Figure 2:
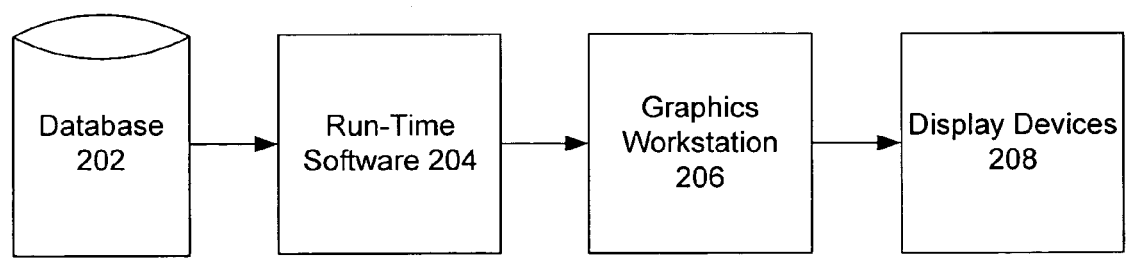
FIG. 2 illustrates the elements of workstation image generation, given run-time software.
Figures 3A, 3B:
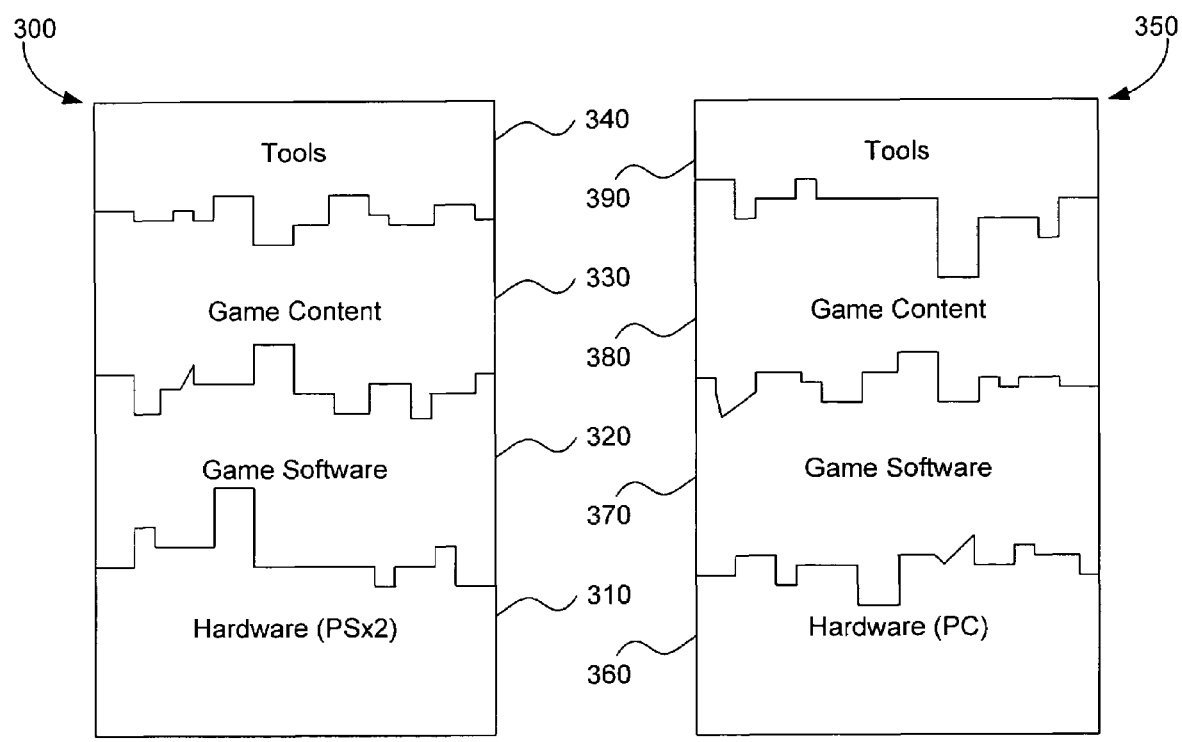
FIG. 3A illustrates the conventional layered approach to game development, customized to a PLAYSTATION 2 platform.
FIG. 3B illustrates the conventional layered approach to game development, customized to a personal computer platform.
Figure 4:
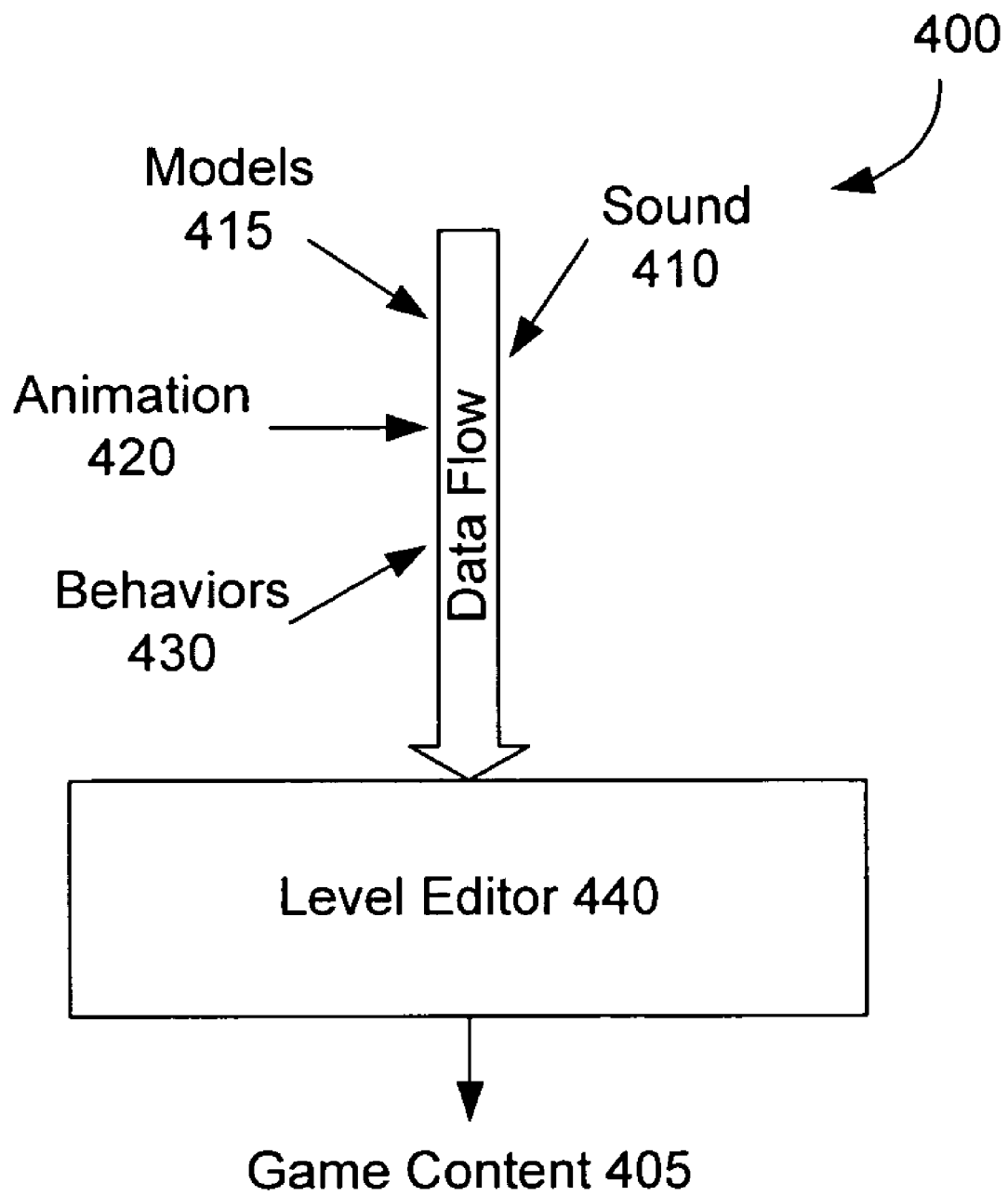
FIG. 4 illustrates the process for developing game content.

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

The invention described in the following sections is based on the concepts of the software platform and the application framework. These ideas replace the current graphical application structure, framework, or libraries with a new framework defining the connectivity, features, and behavior necessary to implement an image generator. All this takes place in the context of a software platform utilizing an integration mechanism that dynamically integrates the various real-time components in a run-time application.

This overview section is organized as follows:
A. Platforms and Frameworks
B. The Graphical Application Platform
C. Graphical Application Framework
D. Features of the GAP
E. Blocks, Connections, and Execution
   1. Block Structure and Interface
   2. Connections Between Blocks
   3. Packaging Blocks as Components
   4. Block Execution Model
F. Extending the GAP
G. The World According to GAP
A. Platforms and Frameworks A platform, as the term is used herein, is a complete environment for executing programs. The most common platform is an operating system along with its system- and language-related run-time libraries. Applications like EMACS, with low-level text management facilities tied together in a user-extendable manner by an internal LISP interpreter, are evolutionary ancestors of application-level platforms. To illuminate the differences between the approach of the invention and its precursors, web browsers can be used as an analogy.

When packaged with scripting and programming extensions, modern web browsers represent a platform for executing web page "programs." Browsers are also applications, and the distinction between application and platform is subtle and often overlooked. The application part provides functions related to networked paperless communication (HTML browsing and editing, electronic mail, news reading, and so on), a graphical user interface, and navigation assists, e.g., links to favorite web sites. The platform part consists of mechanisms to load "programs" (fetching of HTML, JAVA, CGI scripts, etc.), standardized semantics for the meaning of these programs, and a run-time "engine" that evaluates the programs written in HTML, JAVA, and scripting languages.

Historically, browsers did not expose these two roles as separate aspects; one could not make a web page, JAVA applet, or CGI script to redefine or extend the browser's GUI or other built in features, nor could an external developer move the browser interface to a different HTML platform. What would change had browser developers designed for such capabilities? They would have built a "browser virtual machine" (BVM) that could fetch and execute HTML, JAVA, and script languages; this would be the platform. Everyone would run it, but few would know about it, because they would have built a "browser application" identical to previous web browsers but implemented in modules of code executable by the BVM; this would be the application that end-users would see and all of the look-and-feel would be here. However, they would have built mutability into the BVM, so developers could reshape every aspect of the standard browser application, for example, to replace the "GUI module" with one of their own, or extend the "HTML module" with new features.

Browser developers recognize these virtues and are moving to a platform-and-framework approach to web browsing able to serve as the basis for developing new applications that integrate HTML, JAVASCRIPT, and JAVA. Providing this ability to extend and replace modules requires that the application have a higher degree of flexibility and generality than is customary. A framework, according to the invention, can be thought of as this type of comprehensive but mutable application, rather than a construction set API from which to build applications.

Contrasting two hypothetical Christmas tree kits illustrates this difference:

Construction Set. A sturdy tree, a box of lights, a box of ornaments, and no hooks. Comes with instructions reading, "Go for it," and photos of beautiful trees.

Framework. The same tree with lights, hooks, and a few ornaments pre-installed. The hooks allow attachment of whatever additional decorations are made. Existing lights and ornaments can also be removed.

The framework allows independent developers to write modules relying on common concepts in exactly the same way, and it minimizes development because programming complexity is limited to the difference between the standard and new applications. The construction set approach always requires an effort proportional to the complexity of the resulting application. These synergies are the virtues of the framework: it converts new development projects into incremental efforts and encourages modules sharable with others. These notions, platform and framework, are central to the software technique, described herein, for developing portable, high-performance applications that access every bit of hardware differentiation. When translating these concepts from browsers to the real-time graphics domain, additional requirements not present in browsers must be handled, such as time, synchronization, concurrency, and load management, in order to implement a complete graphical application platform.

B. The Graphical Application Platform

The Graphical Application Platform (GAP) implements a platform for graphical application development. Its breadth and extensibility allow implementation of advanced real-time graphics applications that are both efficient and portable. Its three major sections are:

Kernel. The Application Real-time Kernel, or ARK, is an application-level real-time thread manager. It invokes blocks of logic according to a deterministic schedule listing the blocks to be executed by each of one or more ARK threads running on each available CPU. A set of system infrastructure elements is also built into the ARK. These elements dynamically load and unload components, monitor block execution, and assist in thread management, memory sharing, mutual exclusion, and synchronization.

Components. Feature implementations are packaged as executable components that support a powerful negotiation-based resource allocation scheme. Standard components implement concepts like display configuration and position extrapolation and other features amenable to system-specific tuning like morphing an object, advanced surface shading, direct I/O transfers, and universal texture, terrain, objects, and cultural features. Components have portable implementations that are rewritten for specialized hardware through arrangements with hardware manufacturers. This structure and tuning scheme is the primary "differentiated yet portable" mechanism of the GAP. Through it, application developers focus on "what" and "why" and leave the "how" to the platform developers and allied hardware partners.

Connections. Connections implement the flow of data between blocks, within or between the components. They effect one-way transport from an upstream block to a downstream block—they provide the "plug board" to change communication patterns—an essential task when inserting a new block or replacing an old one. Consider, for example, a connection between one block that traverses a graph to extract potentially visible objects and another block that receives objects and draws them. It may be desirable to insert a new block, say one to reject anything with an on-screen projection smaller than a given size, between these two. Doing so means deleting the connection between traverse-and-draw, and adding connections between traverse-and-reject and between reject-and-draw. The ARK implements such run-time reconfiguration without recompilation through efficient concurrency-aware connection facilities.

C. Graphical Application Framework

The GAP also provides a framework for graphical application development. A complete graphics application can be provided, one that developers can use directly or modify and extend as desired. By providing a standard application, a common naming and structure framework is established for derived applications, housing the mix-and-match flexibility in a concrete semantic context.

Although the design supports expansion to multiple CPUs and multiple graphics devices, in practice this does not imply any overhead for smaller configurations. The idea is to provide a structure that is just more fully populated in advanced configurations. The framework application provides the common overarching structure for a broad class of graphical applications—a structure built of blocks that can be removed, replaced, and extended, and with connections between blocks that can be disconnected and reconnected, exposed and hidden. This allows a developer to reshape as much of the GAP framework as deemed necessary to implement a custom application while leaving the system logically intact and, if desired, extensible by others. It also means that developers need only understand as much of the GAP as they change.

The application framework defines several phases, each of which corresponds to a potentially concurrent thread of execution. Components are partitioned between these various framework phases. The GAP architecture provides automatic detection of parallel access to data for correct pipelined execution. This feature provides independence from the hardware architecture while enabling transparent, yet efficient, parallelism at all levels of implementation. This GAP capability can greatly reduce development time for complex, multi-threaded applications.

D. Features of the GAP

GAP features are organized in four groups, in an embodiment of the invention. The kernel (ARK) provides access to hardware resources and public data structures. Standard platform features implement tasks commonly used in applications. Market-oriented features address concepts of particular domains. And application-specific features offer uniqueness to a particular application.

Application Real-time Kernel (ARK). In an embodiment of the invention, this includes process management, threads of execution, and physical resources like processors, graphics pipelines, displays, texture memory, frame buffer memory, and system memory; mutual access exclusion, explicit data sharing, and implicit data privacy; high-precision counters, timers, and, time of day clocks; asynchronous file-system operations and memory transfers; and run-time component loading and unloading.

Standard Platform Features. In an embodiment of the invention, these features include input device management; morphing, interpolation, deformation, and evaluation; spatial audio processing; activity logging and replay; configuration file parsing and evaluation; coordinate system processing, including precision management and articulation graphs; and, paging of objects, textures, materials, and sounds.

Market-Oriented Features. In an embodiment of the invention, these are the standard concepts of an industry. For basic visual simulation, this includes a universe model supporting ephemeris time; geo-referenced temporal positioning; solar system object position and appearance; visualization of the star-field and constellations; height above terrain, line of sight intersection, multi-point terrain following, object intervisibility determination, and collision detection; an atmospheric model with patchy layered fog, horizon haze, scud clouds, dynamic cloud volumes, and directional horizon glow; special effects for rain, sleet, snow; and many other features.

Application-Specific Features. In an embodiment of the invention, these elements extend or reshape the framework into a particular application. For example, this can include motion models, command line processing, environment variable processing, graphical user interface customization, and, application-specific database loading and decoding logic.

Together, the ARK and standard features define the Graphical Application Platform (see FIG. 5), which when combined with one or more market-oriented feature sets, defines a comprehensive development and deployment platform. GAP-based developers use these features, those from market-oriented collections, and custom application-specific features to implement their applications.

E. Blocks, Connections, and Execution

1. Block Structure and Interface

Figure 6:
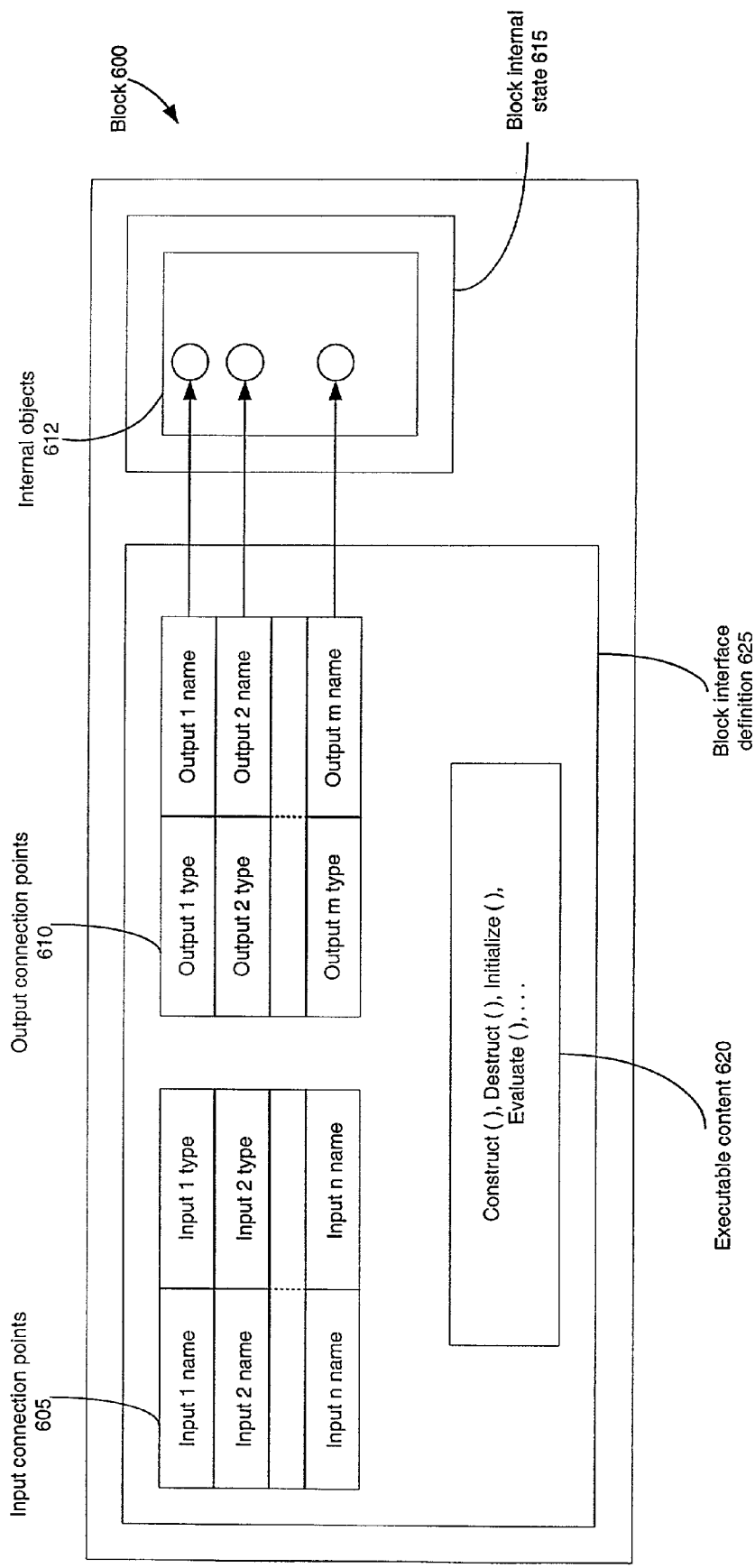
FIG. 6 illustrates an example of a block internal structure, according to an embodiment of the invention.

Blocks are the basic elements of the GAP framework, defining the "atoms" of interactive visual computing. They are the basic unit of execution within the GAP and are end-points for input and output linkages. Once built, blocks are bound into an application (or to an encapsulating block) by constructing connections between its input and output points and compatible points on other blocks. A block does not know the identity of the blocks that provide its input or that of blocks that connect to its output. Data specified in the block interface definition allows the ARK to implement this run-time dynamic connection facility for compiled blocks invisibly and efficiently. FIG. 6 shows the internal structure of a generic block 600 according to an embodiment of the invention. Block 600 contains the following elements:

Input connection points 605. Each such input point has a name and a type. Names are used when making connections, both internally and externally. Types may be compound data structures, in which case access can be to "member of name" in addition to the aggregate "name."

Output connection points 610. Each such output point has a name and a type. Output points correspond to public state elements derived from intrinsic objects. Access to these internal objects is provided to other blocks that are connected to the corresponding output points.

Internal state elements 615. These elements include state information, i.e., block instance data.

Executable content 620. This includes standard functions, such as construct ( ), destruct ( ), and initialize ( ) to provide object lifetime services, and an evaluate ( ) function that implements the processing of the block.

Executable content 620, output connection points 610, and input connection points 605 can be viewed as components of the interface definition 625 of block 600.

In one example, most blocks are implemented in natively compiled and optimized assembler, C, and C++ code. Others, known as compound blocks, can be expressed purely by weaving simpler blocks together as a processing graph. These reticulations define links into and out of the block and linkages from the block's input and output to and between internal blocks, and can be defined and implemented with simple scripts.

2. Connections Between Blocks

Connections link blocks together. They are essentially a means to specify the arguments for subroutine invocation through a general connection topology that allows changes to the connection topology after the functions have been compiled. A single connection can be established from each block input point to a compatible output point of any other block.

Many properties of connections are explained by visualizing them as one-way pipelines where data flows from an internal data member (derived from an object) through an output point of one block (the producer) downstream to an input point of another (the consumer). Connections are created at run-time and can be made and broken during execution. For example, moving an eye point through a scene may cause the geometry-paging feature to load a new animation component along with newly paged geometry. The incoming animation block would need to be attached to the camera position and the connection would be made as described above. Once connected, the camera position data is available to the newly loaded block when the internal accessor functions associated with the block's input points are invoked.

By maintaining this dataflow model irrespective of concurrency mode, the ARK offers coherent access to data shared between concurrently executing blocks; allows sporadic generation and consumption of data between blocks that operate synchronously at different rates or asynchronously; and, offers temporal coherence for processing pipelines with several multi-megabyte frames of data being processed simultaneously.

3. Packaging Blocks as Components

Components are the highest-level objects in the GAP environment. They are factories for generating new collections of blocks based on an iterative global resource allocation process that chooses between logically identical alternates that typically have very different physical realizations.

Components are designed to prudently answer questions of the following form at run-time:

"What should be added to the framework to insert a particular feature, given a specific hardware configuration and constraints on available resources?"

Figure 7:
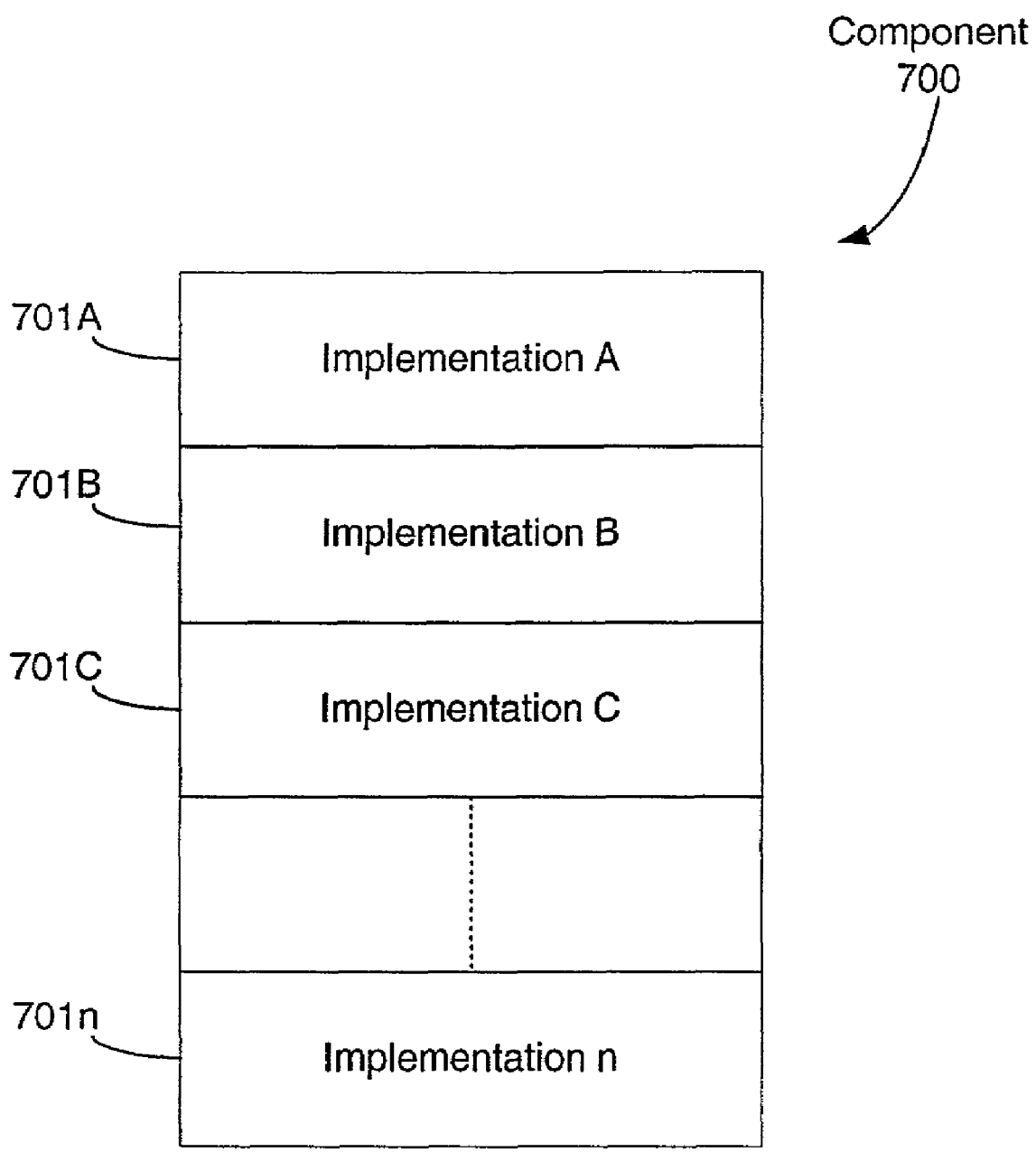
FIG. 7 illustrates the structure of a component, according to an embodiment of the invention.

This question is difficult as it depends on both local and global information:

Locally, as seen in FIG. 7, one of several available implementations (701A through 701n) of a feature may be chosen based on constraints, such as the availability of hardware or other resources. Globally, one implementation may be preferred over another in order to avoid overuse of a critical resource or to optimize based on application preferences, such as image quality or rendering rate.

Figure 8:
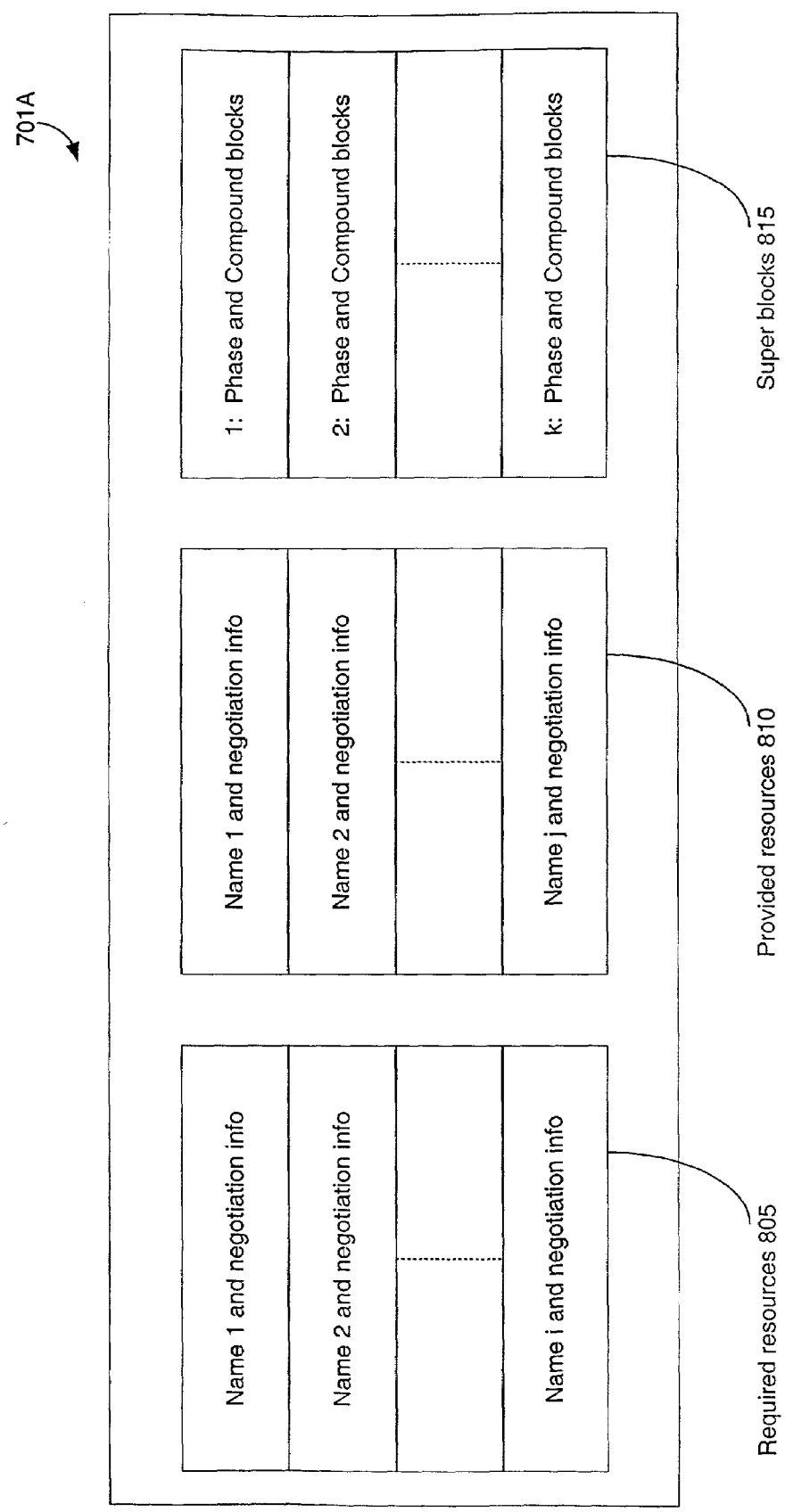
FIG. 8 illustrates an alternative component implementation, showing the associated resource requirements and the provided resources, according to an embodiment of the invention.

As shown in FIG. 8, each alternate implementation, e.g., alternate implementation 701A, has a list of resources 805, such as system memory, texture memory, CPU requirements, and data-transfer bandwidths that are required to successfully instantiate the particular implementation and information used to reduce these requirements when a resource negotiation is necessary and possibly expand the requirement when resources are abundant.

Components may also introduce new resources into the system. Each alternate implementation includes a list of resources 810 provided by that alternate. New resources also have resource negotiation information, supporting supplier-side bargaining in subsequent negotiations over the new resource.

After the components in an application have been identified, each is asked about its resource requirements; the answer is the list of the alternate implementations and their required resources. Aggregating these requirements specifies a run-time multidimensional resource allocation task.

When a single solution exists, the chosen alternative is communicated to each component which then instantiates the corresponding implementation. Links into and out of the component become links into and out of the blocks of that implementation.

In an embodiment of the invention, when more than one combination of alternative implementations fits within resource constraints, then the chosen configuration is based on weighting parameters contained in the component definitions and evaluation equations provided by the application developer. This preferred solution is then communicated with the components which instantiate the chosen alternatives and link them into the framework.

If resources are over-subscribed then there is no direct solution, and the system enters a negotiation phase in which each block is asked which of its resource requirements can be reduced and what the penalty would be for making such a trade-off. A typical example would be texture memory resources that could be reduced by one-fourth at the penalty of blurry images. Another example would be system memory resources minimized by incremental paging rather than fully pre-loading data at the expense of extra CPU utilization and data transfer bandwidth consumption. This negotiation continues until an acceptable configuration is reached.

The resource allocation process assures that no component's implementation is instantiated unless all necessary resources are available and that an appropriate decision about which of several alternatives is chosen in response to available resources.

4. Block Execution Model

Figure 9:
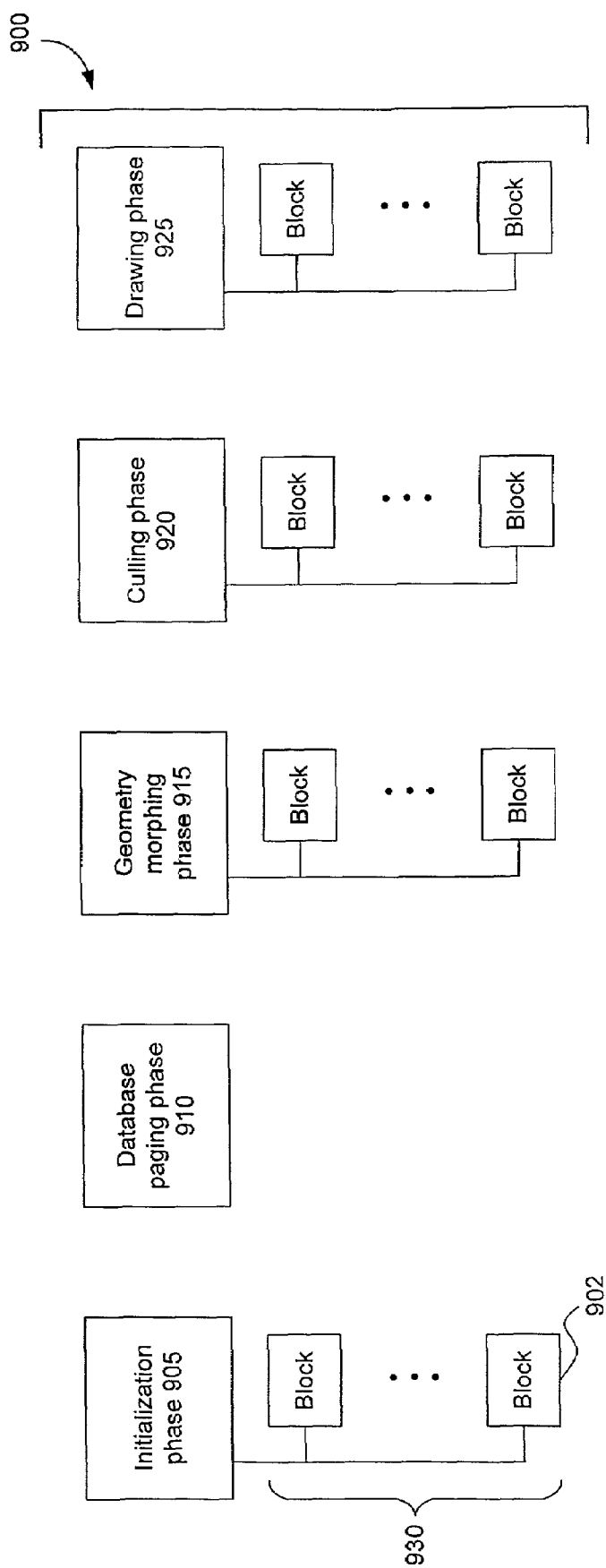
FIG. 9 illustrates a distribution of blocks among a framework's phases, according to an embodiment of the invention.

FIG. 9 illustrates the concept of phases of execution according to an embodiment of the invention. After resource negotiation is completed, the blocks comprising the application (such as block 902) are distributed among the framework's phases 905 through 925) as specified in the component definitions. This results in phase lists, such as list 930, each containing zero or more blocks. For example, the database-paging phase list will be empty if an application does not include the standard database-paging component. Each non-empty phase list defines a potentially concurrent phase of the application.

Figure 10:
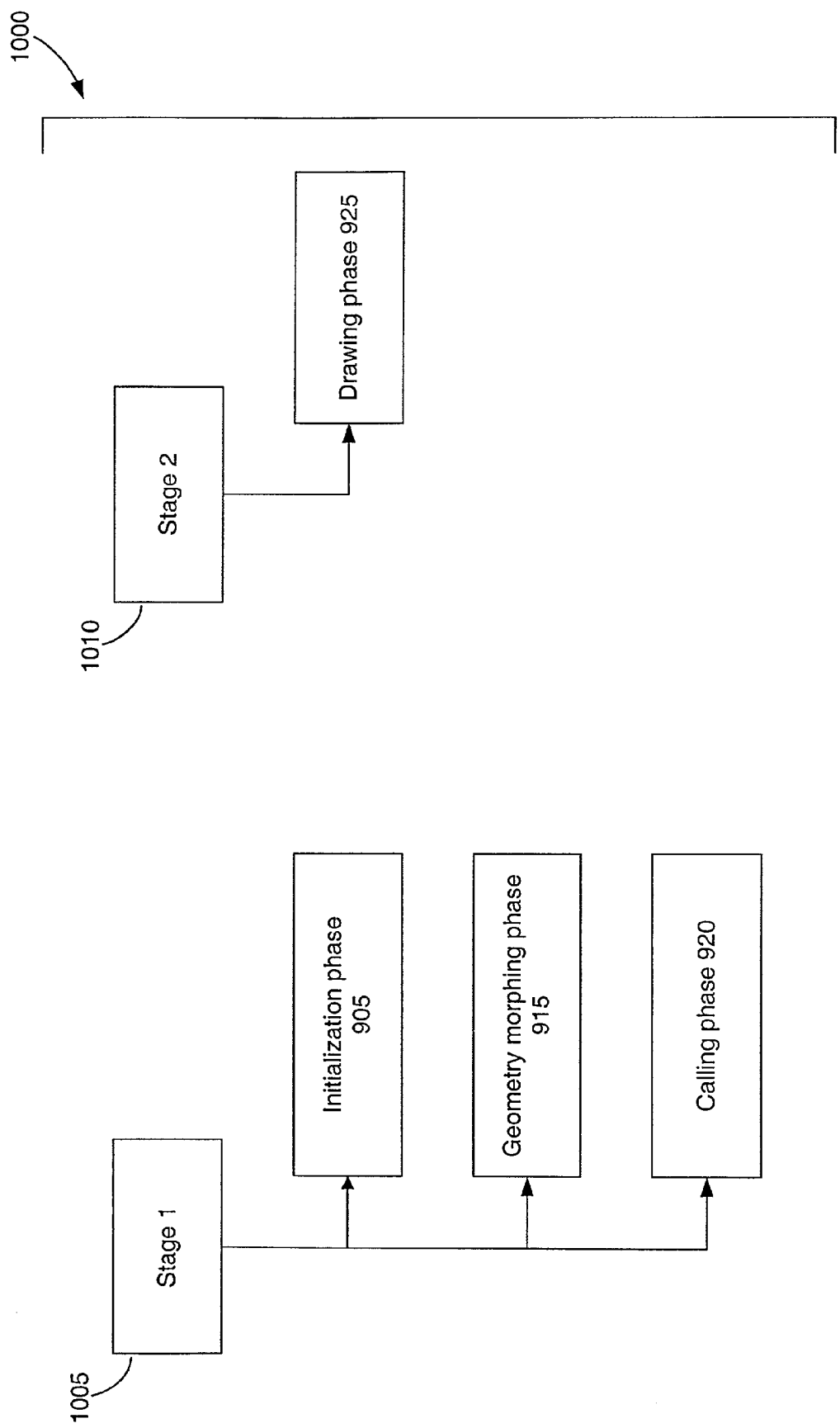
FIG. 10 illustrates examples of stages executed in a single threaded process, according to an embodiment of the invention.

FIG. 10 shows how non-empty phases are mapped to stages of execution according to an embodiment of the invention. Each execution stage represents a collection of phases that the ARK will execute in a single thread. Stage 1005, for example, represents initialization phase 905, geometry morphing phase 915, and culling phase 920. Stage 1010 represents drawing phase 925.

Figure 11:
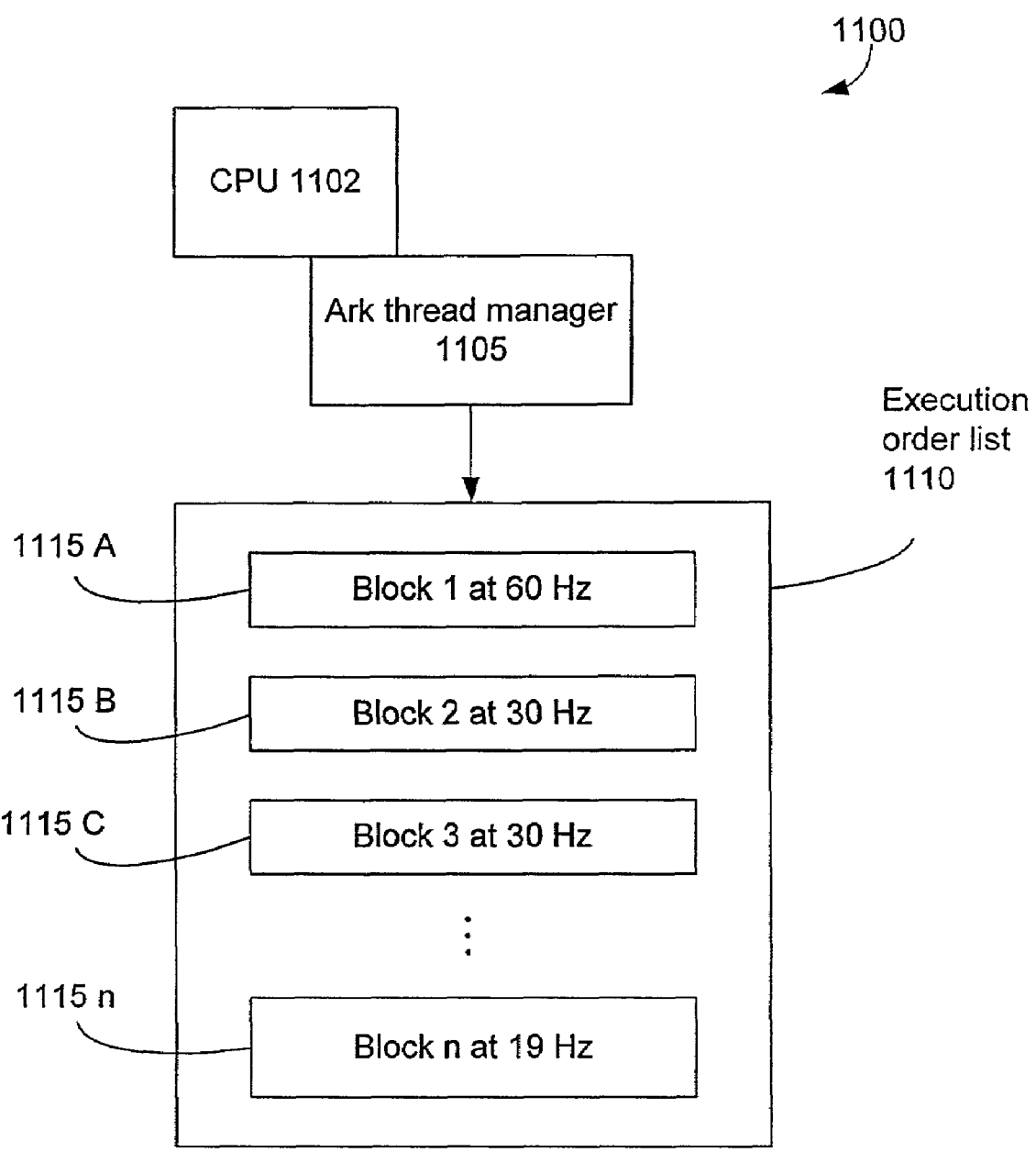
FIG. 11 illustrates a single ARK thread manager and its execution order list, according to an embodiment of the invention.

The resulting stages of execution are prepared for execution by generating a deterministic execution order list. This list arranges the pair-wise block orderings (imposed by connections) into a total ordering of the blocks in the phase's block list in an embodiment of the invention. This is shown in FIG. 11. The execution order list 1110 resulting from phase to stage processing is an input to the ARK and evaluation of such lists is a primary ARK activity. In the sequential execution environment a single ARK thread, under the control of an ARK thread manager 1105, continuously iterates over the execution order list selecting and executing some or all of the blocks during each pass. The ARK supports cases where some blocks run at different rates, as seen in FIG. 11.

Figure 12:
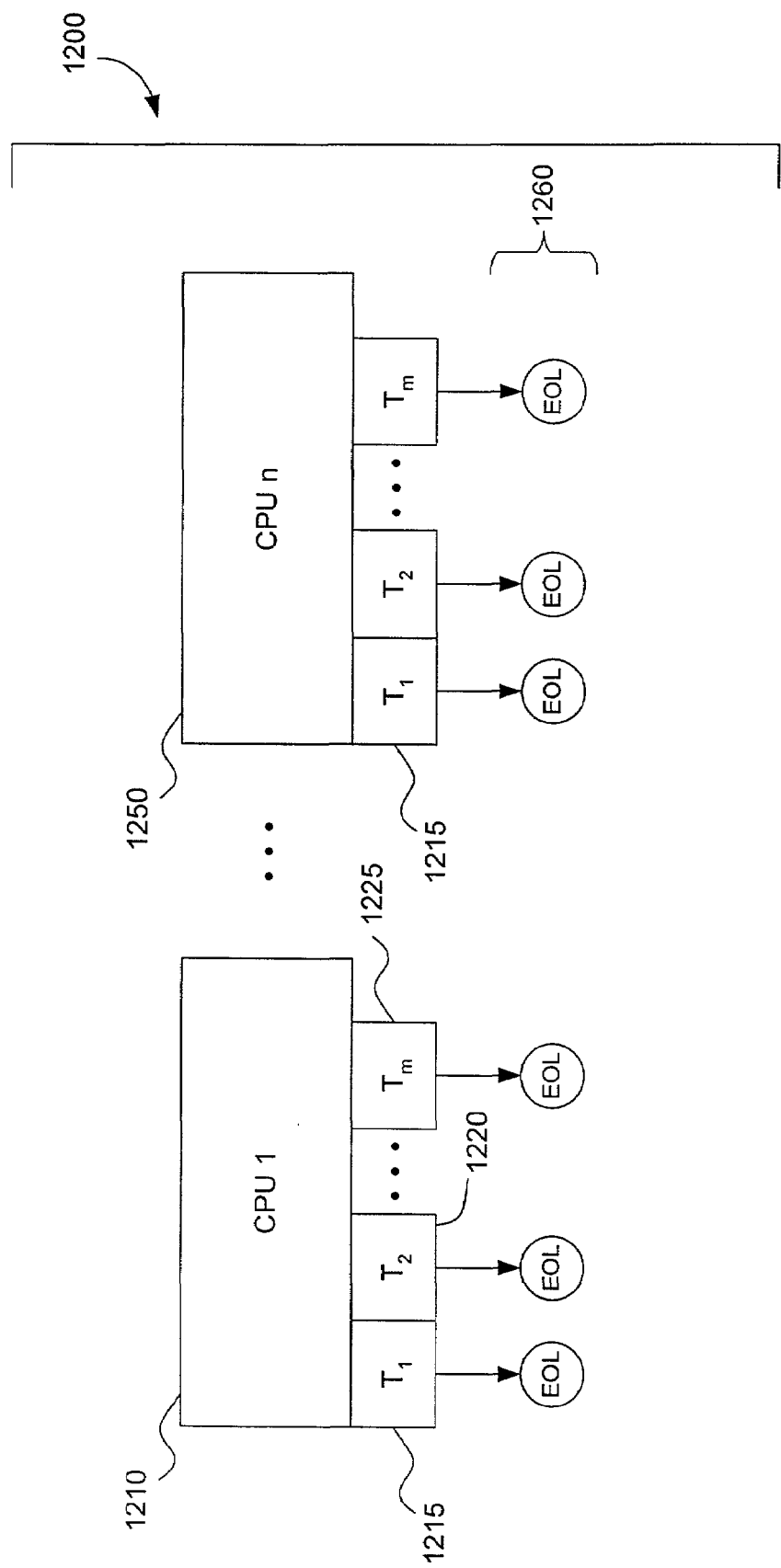
FIG. 12 illustrates concurrent execution of multiple ARK threads comprising execution order lists, according to an embodiment of the invention.

Concurrency support within the ARK handles (1) multiple threads on a single processor (termed multi-threading or multi-programming), (2) a single thread on each of multiple processors (multi-processing), and (3) arbitrary combinations of these modes. In concurrent execution, there are multiple ARK threads $T_1$ through $T_n$ each with its own block execution order list (EOL), as shown in FIG. 12.

Converting the flattened application graph into multiple lists will generally cause connections between some of the blocks to span an ARK thread boundary, with the upstream and downstream blocks in different lists. This has significant implications for shared data, which is a case handled invisibly by the ARK.

F. Extending the GAP

Both standard and user-developed GAP features are designed and implemented as components, and as such, they enjoy an unusual degree of flexibility and potential impact: they can replace existing components, replace individual blocks within components, change existing connections, insert themselves between existing blocks, and define the areas of desirable concurrency with each of their alternate implementations. Each of these tasks is performed openly by labeling the actions, impacts, and resource implications, as opposed to the anonymous "tree decoration" model of the scene graph. Completeness in the GAP extension model suggests that a given component can be added to many GAP-based applications. Components will negotiate for their needs, and the ARK late-integration process will globally adjust the application based on the requirements of the newly inserted components while honoring the preferences defined in the application.

Consider the "universal texture" feature of the GAP as an example of the extension process. The desire is to provide an application with texture images of enormous extent, such as a centimeter-resolution representation of the earth's surface as a single 10,900-terabyte-texture map. This technique has many practical advantages, including decoupling texture paging from geometric subdivision to afford the capability to use the same database on different hardware platforms.

The universal texture component implements its task in a three step process: moving data from disk or across a network to main memory, moving data from main memory to graphics device texture memory, and using view information and the downloaded textures on a per-frame basis to implement the universal texture concept. The GAP implementation separates these steps into several potentially concurrent phases, each with several blocks interconnected using ARK connections, and all characterized based on resource requirements and preferences. The implementation uses highly efficient direct I/O for disk transfers, uses main-memory as a texture-cache that handles cache update complexities at the International Date Line and the poles, and redefines texture-processing details as needed to implement universal texture semantics. When this component is inserted into a GAP-based application, it correctly provides the universal texture feature without requiring update or recompilation of other modules and does so across a range of graphics hardware.

Hardware vendors offering special features useful for implementing universal texture (e.g., Evans & Sutherland global texture unit, SGI Clip-map hardware, SGI UMA visual workstations, S3 texture compression modes, etc.) can replace the standard GAP implementation with one that accesses differentiating features of the hardware. Such vendor localizations define more than graphics; they also specify concurrency models and application structure to suit their implementation based on issues like texture load latency and interactions with other components as resolved during negotiation.

Figure 13:
FIG. 13 illustrates a view of the Earth view developed using the GAP architecture, according to an embodiment of the invention.

Applications using the universal texture feature, such as an image of the earth as shown in FIG. 13, inherit vendor-specific tuning when they are executed, demonstrating how hardware developers can greatly increase the adoption rate of their new features since even previously released GAP-based application software requires no modification or re-release to access the benefits of new hardware.

G. The World According to Gap

The GAP architecture brings a new implementation technology to the real-time visualization marketplace that separates vertical application-level features from their implementation environment. This separation expands the modularity of graphics and multimedia applications by untangling the previously intertwined tasks of application development, content development, and hardware development, as follows:

Decoupling of Applications and Content. The GAP makes applications largely independent of content, since behavioral modules packaged with content by model builders can provide portable behavioral definitions. Semantic bridges between modeling tools and the GAP ensure that the personality displayed by active content within modeling tools matches that shown when the content is used in GAP-based real-time software.

Decoupling of Content and Hardware. The GAP environment separates content-level designs from hardware-level expressions of those decisions. Its structure allows the development of content based on standard definitions of intent that are tuned to each hardware platform not by the content developer, but by the hardware vendor through porting and tuning of standard GAP components.

Decoupling of Hardware and Applications. The GAP removes the dependence of application developers on unique hardware characteristics, allowing application development for a "virtual" visualization platform rather than a particular hardware and operating system combination. Conversely, the GAP allows hardware vendors to integrate unique characteristics of their hardware into pre-existing applications, easing vendor concerns about attracting applications to their special hardware features.

II. GAP and ARK

A. Platforms and Frameworks

When the term "platform" is used herein, it means a self-contained environment for executing some type of program. The most common platform is an operating system along with its system- and language-related run-time libraries. Applications like EMACS, which provides low-level text management facilities tied together in a user-extendable manner by an internal LISP interpreter, are evolutionary ancestors of application-level platforms. The type of platform described herein is different from applications like EMACS and traditional operating system platforms. To illuminate the differences and the motivations for these differences, consider platforms and frameworks in the web browser space where the concepts are self evident.

In the JAVAsoft JAVA environment, the JAVA virtual machine (JVM) is the platform for executing JAVA byte-codes. Combining the JVM with standard JAVA classes in byte-code form creates a platform for JAVA applications. In a similar sense, NETSCAPE and MICROSOFT's INTERNET EXPLORER both contain a platform for executing HTML. When packaged with scripting and programming extensions, these browsers represent a platform for executing web pages within the context of the browser application. In the operating system context, programs and shell scripts replace HTML pages and the operating system is the platform.

Browsers are also applications, but the distinction between application and platform is subtle. NETSCAPE the application provides functions related to networked paperless communication (HTML browsing and editing, electronic mail, news reading, and so on), a graphical user interface, and navigation assists like links to favorite web sites. The platform aspect of NETSCAPE consists of mechanisms to load "programs" (e.g., fetching of HTML, JAVA, CGI scripts), standardized semantics for the meaning of these programs, and a run-time "engine" that evaluates the programs written in HTML, JAVA, and scripting languages. Historically, NETSCAPE's browser products did not expose these two roles as separate aspects; one can't make a web page, JAVA applet, or CGI script that redefines or extends the browser's GUI or other "built in" features nor could a user move the NAVIGATOR browser interface to a different HTML platform—but what if NETSCAPE had designed for that capability?

1. They would have built a "browser virtual machine" that could fetch and execute HTML, JAVA, and script languages; this would be the platform. Everyone would run it, but few would know about it, because . . .

2. They would have built a "browser application" that was identical in function to NETSCAPE NAVIGATOR but implemented in modules of code executable by the BVM; this would be the application that end-users would see and all of the look-and-feel would be here, except . . .

3. They would have built an "extend and replace" capability into the BVM, so developers could reshape every aspect of the standard browser application, for example, to replace the "GUI module" with one of their own, or extend the "HTML module" with new features.

Both NETSCAPE and MICROSOFT recognize the importance of this approach. Each has announced support for a platform and framework approach to web browsing that can serve as the basis for developing other applications that integrate HTML, JAVAScript, and JAVA. MICROSOFT now provides a browser that can have its user interface replaced, accept plug-in modules that redefine standard features, and serve as a plug-in module to support HTML rendering within other applications. The design and structure of the competing platforms are quite different:

NETSCAPE's approach is to be a complete browser platform within an operating system independent application. They use the CORBA component-programming model and their CORBA implementation is written in Java.

MICROSOFT's INTERNET EXPLORER and the INTERNET EXPLORER Application Kit (IEAK) relies on WINDOWS operating system services for key features in the fight to define their operating system as the platform for browsing. IEAK uses the COM component programming model and COM-based ActiveX components.

Sun's Java takes a third view, positioning a their programming language as the universal platform. They include operating system functionality in the language's run-time environment and mandate every feature necessary for browsing (AWT, Java2D, Java3D, etc.) as inherently available elements in their interpreter.

Providing the ability to extend and replace modules requires that the application be built with a higher degree of flexibility and generality than is customary. An "application framework" is defined to be precisely this type of mutable application. Note that the application framework is explicitly intended to be a complete application (though perhaps with dormant capabilities) that already does the general thing in a standard way, rather than a construction set from which an application could be built.

The framework provides a structure so that independent development teams can write modules relying on common concepts in the same way. It also means that development is eased because programming complexity is limited to the difference between the standard application and the new application. When the standard application provides the majority of common features, then this difference is low. The construction set approach always requires a programming effort proportional to the complexity of the resulting application. These virtues define the synergy of the framework; it converts new developments into incremental ones and encourages modules that can be shared with and licensed to others.

When these concepts are translated from browsers to our real-time graphics world, it is a good match, although several demanding issues that are not part of the browser analogy must be handled. These issues include time, synchronization, concurrency, and performance management. The notions of platform and framework are the basis for the invention described herein, and enable portable, high-performance, media-rich applications that use the differentiation provided by hardware.

The implementation of the platform and framework concepts described herein results in two major differences from other platforms.

First, by designing for performance before compatibility, many of the complexities faced by the CORBA and COM component interfaces, for example, are avoided. In particular, since each of these seeks domination over the other, they attempt to support each other's components through a foreign-function interface: COM-based applications like INTERNET EXPLORER can include CORBA components and CORBA-based applications like NETSCAPE can include COM components. Such compatibilities come at significant expense in terms of performance and complexity. Here, no external compatibility is needed. The interface model can be structured to best fit application goals and the underlying implementation.

Secondly, multi-threading is supported as an intrinsic feature of the platform. The component interface is designed to be a partner (along with an application-level real-time kernel) in efficiently implementing invisible concurrency. This is in contrast to COM and CORBA which are not thread-safe themselves unless serializing locks wrap each entry point and which leave concurrency issues to component builders.

These differences distinguish the GAP from other middleware frameworks.

B. GAP as Application Platform

The GAP implements a platform for graphical application development. Some targeted applications are expressible within the facilities supported by the GAP in combination with new capabilities that can be added to the GAP by application developers in the form of extension modules called blocks. The "platformhood" of the GAP results from this structure:

Kernel. The Application Real-time Kernel (ARK), an application-level real-time thread manager. The ARK invokes blocks according to a schedule listing the blocks to be executed by each of one or more ARK threads running on each available CPU. A set of system infrastructure elements accompanies (and in some cases is built into) the ARK. In an embodiment of the invention, these elements dynamically load and unload components, monitor block execution, and assist in tasks like thread management, memory sharing, mutual exclusion, and, synchronization.

The ARK provides a modular framework that can best be thought of as an efficient, configurable, real-time, performance-centric, graphics virtual machine definition and execution framework. The ARK is designed to manage the flow of data and to schedule all of the processing of graphics processes. It is the smart glue that digests an application piece by piece, understanding the structure and intent, and then managing that intent efficiently and robustly in a real-time manner. Although designed to be as thin and light as possible in an embodiment of the invention, the ARK gets its power from an application definition semantic which corresponds to an efficient run-time implementation. The ARK makes application definition (including data flow and processing scheduling) explicit and modular. It abstracts the interface between modular code segments with highly efficient data interfaces rather than slower functional interfaces, separating processing and data flow. It forces developers to explicitly define and relate each code module to the overall application machinery, allowing vertical feature development of components of the machine. These components can be developed quickly and independently with current programming methodologies (such as C/C++)—the ARK has little or no direct influence over developer's use of their standard programming methodologies. Thus, the ARK can defines, in effect, a new feature level driver model for the entire application. This new application driver model inherently provides automatic, re-configurable, multi-thread, multi-process, multi-buffer data management of single threaded code modules. The ARK, although it manages all data that flows between system modules, can be data structure agnostic and will allow for and manage run-time extension of user-defined data structures even across multiple developers. In summary, the ARK provides the ability to define an application from its code modules, data structures, and data flow, while providing everything necessary to act as an efficient run-time kernel enforcing definition-time semantics (via control of data flow and module scheduling).

Blocks. The ARK operates in the context of blocks. The blocks are grouped into replaceable components supporting a novel and powerful negotiation-based interface definition. The term "module" is a general reference to the three types of blocks:
  simple blocks that perform a computation,
  compound blocks that connect internally instantiated blocks, and
  super blocks that are a connected network of simple and compound blocks.

Components are special meta-blocks; they deliver a collection of super blocks at the completion of a resource negotiation. In addition to system-related blocks, numerous standard feature-level components are provided with the GAP. In an embodiment of the invention, these elements implement commonly used features (e.g., opening a window, interpolating a quaternion, broadcasting a position), features that are amenable to system-specific tuning (e.g., morphing an object, bump-mapped surface shading, direct I/O transfer), and features that can distinguish GAP-based applications (universal texture, terrain, objects, and culture). The blocks themselves can be implemented portably in reference code, and are specially tuned for specific hardware through arrangement with hardware manufacturers. This structure and tuning scheme is the primary "differentiated yet portable" mechanism of the GAP.

Connections. Blocks are linked by one-way connections that represent the flow of data from the upstream block to the downstream block. Connections are critical elements of the design as they provide a "plug board" to change communication patterns which is an essential task when inserting a new block or replacing an old one. Consider, for example, a connection between a component that traverses a graph to extract potentially visible objects and a component that receives objects and then draws them. A developer may want to be able to insert a new component, say one to reject anything with an on-screen projection smaller than a given size, between these two. Doing so means deleting the connection between traverse and draw and adding connections between traverse and reject, and between reject and draw. This can be supported without recompiling any blocks through the run-time connection facilities of the ARK.

Natively compiled and optimized code (assembler, C, C++, etc.) can be supported as the primary implementation mode for block development. The native code approach limits portability compared to pure interpretation, but there can be a need for speed. Blocks are portable to the degree of compiler compatibility so block developers may need conditional compilation or alternate implementations on different platforms.

The GAP support of natively compiled modules and language-independent interface definitions means that developers can use the skills and code they have already developed when building applications for the ARK.

Some blocks can be expressed purely by weaving other blocks together into a processing graph. These types of blocks are called "compound blocks" as opposed to the "simple blocks" that perform processing. Developing a connection-only block means defining links into and out of the block and the linkages from the block's input and output to and between the internally instantiated blocks, which can be done through a scripting language or a lightweight connection parser. Such reticulation blocks can be handled without the need for run-time block code by automatically collapsing each "link-to-a-link" into a single link, or equivalently by considering a compound block as a macro that is expanded before use.

It may be desirable to implement a block using a scripting language when processing duties are light or infrequent. Interpreted scripts provide guaranteed portability across GAP implementations irrespective of compiler variations. The plan is to create a flexible scripting mechanism (primarily handling non-deterministic actions like mark-and-sweep garbage collection and marshalling arguments into and out of the interpreter) so that various languages can be supported by the same infrastructure.

C. GAP as Application Framework

The GAP also provides a framework for graphical application development. It is a graphics application that developers can use directly or else modify and extend as desired. This application can provide an interactive graphics viewer that can be distributed to end-users. Application developers can reshape the application by adding custom blocks and replacing some of the standard ones before shipping their GAP-based products. By providing a standard application, a common naming and structure framework is established for derived applications; mix and match flexibility is then imbedded in a concrete context.

Conceptually, the framework application can be designed in the following manner. First, the class of applications that the GAP is to address is considered. This includes graphics-rich games and interactive entertainment, traditional visual simulation, real-time applications in video and film production and on-air broadcast, and advanced geo-spatial information systems used in mission rehearsal; hardware configurations (e.g., number of CPUs and graphics pipelines); and the WINDOWS 98, WINDOWS NT, and UNIX-like (IRIX, SOLARIS, and LINUX) operating systems. Next, these applications are examined to find a general structure that could address the union of their needs. The resulting structure defines a unifying application framework, which must then be segmented into potentially concurrent phases of execution. Key features within the framework are then expressed as standard components. The component definitions along with the blocks that comprise them define the standard blocks.

Exerting the effort to find a common substrate across application domains and levels of hardware sophistication means that the GAP can provide a natural home for advanced features as they migrate to lower-cost, higher-volume platforms.

Although the design supports expansion to multiple CPUs and multiple graphics devices, this does not imply overhead for smaller configurations. A structure can be provided that is more fully populated in advanced configurations. Several important characteristics emerge during the design of the framework application that may be indicative of designing for the GAP in general. Here is a summary:

- The design can employ smart high-level data structures as buffers between data flows in various parts of the application, mostly in the form of smart caches where data are reused across a span of renderings. In block form, these structures have a small control interface and implicit internal processing. Examples include the object graph, articulation graph, atlas and index maps, object, image, and audio caches, and, command and classification and bins.
- Early processing components are generally asynchronous between both themselves and the back end, while the back end stages are simpler and run synchronously at the image computation rates.
- Most connections are local to a phase. There are two major exceptions: linkage to some of the lower-level GAP standard blocks occurs everywhere but seems easy with respect to concurrency, and a few linkages travel from near the front of the block graph to the near the end, short circuiting asynchronous execution and pipelining between the endpoints.

As a framework, this application provides the common overarching structure for a broad class of graphical applications—a structure built of blocks that can be removed, replaced, and extended, and with connections between blocks that can be disconnected and reconnected, exposed and hidden. This allows a developer to reshape as much of the GAP framework as necessary to implement an application while leaving the rest of the system intact and extensible by others. It also means that developers must only understand and touch as much of the GAP as they need to change.

Figure 14A:
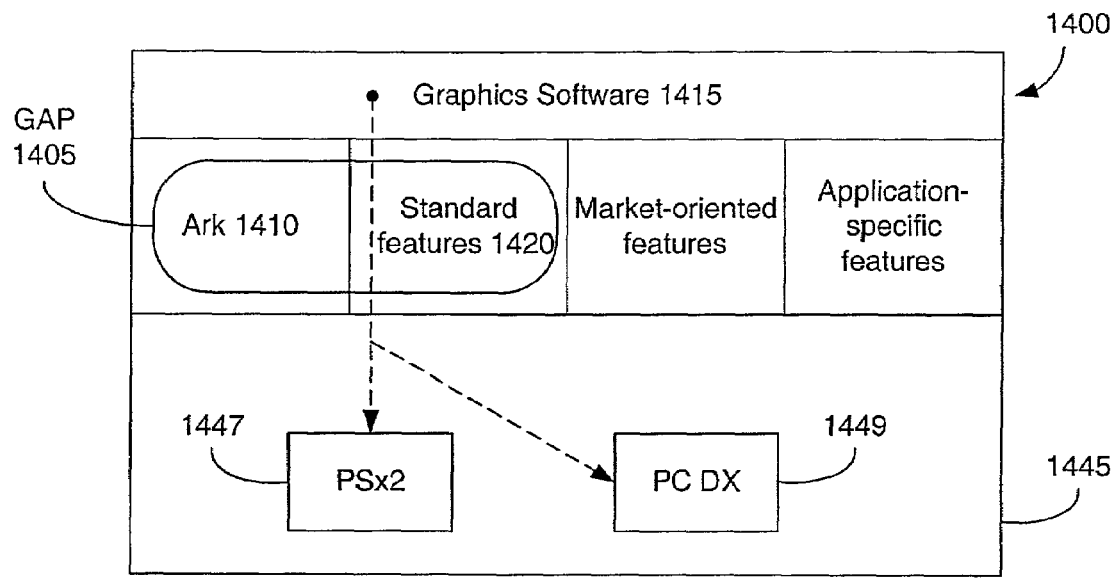
FIG. 14A illustrates the use by a software developer of existing features supported by the GAP across multiple hardware platforms, according to an embodiment of the invention.
Figure 14B:
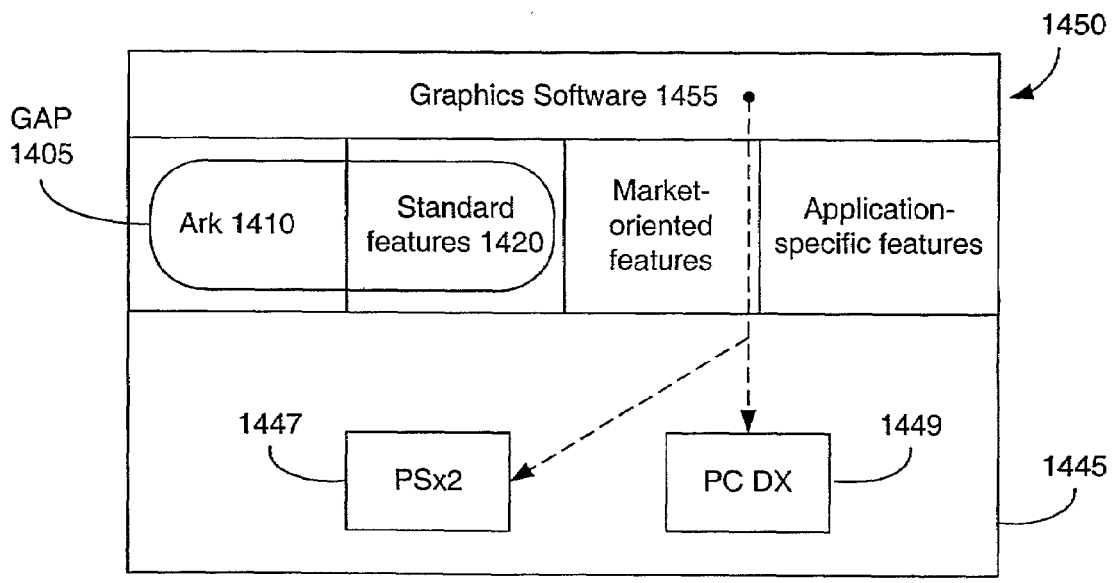
FIG. 14B illustrates the use of an application-specific feature added by a software developer and supported by the GAP across multiple hardware platforms, according to an embodiment of the invention.

This is illustrated in FIGS. 14A and 14B. FIG. 14A shows graphics software 1415 using one or more of standard features 1420, provided with the ARK 1410, to facilitating execution on either of multiple hardware platforms 1447 (a SONY PLAYSTATION 2) and 1449 (a personal computer).

In contrast, FIG. 14B shows graphics software 1455 using one or more of the features 1460 that are specific to the application, facilitating execution on either of multiple hardware platforms 1447 and 1449.

Figure 15A:
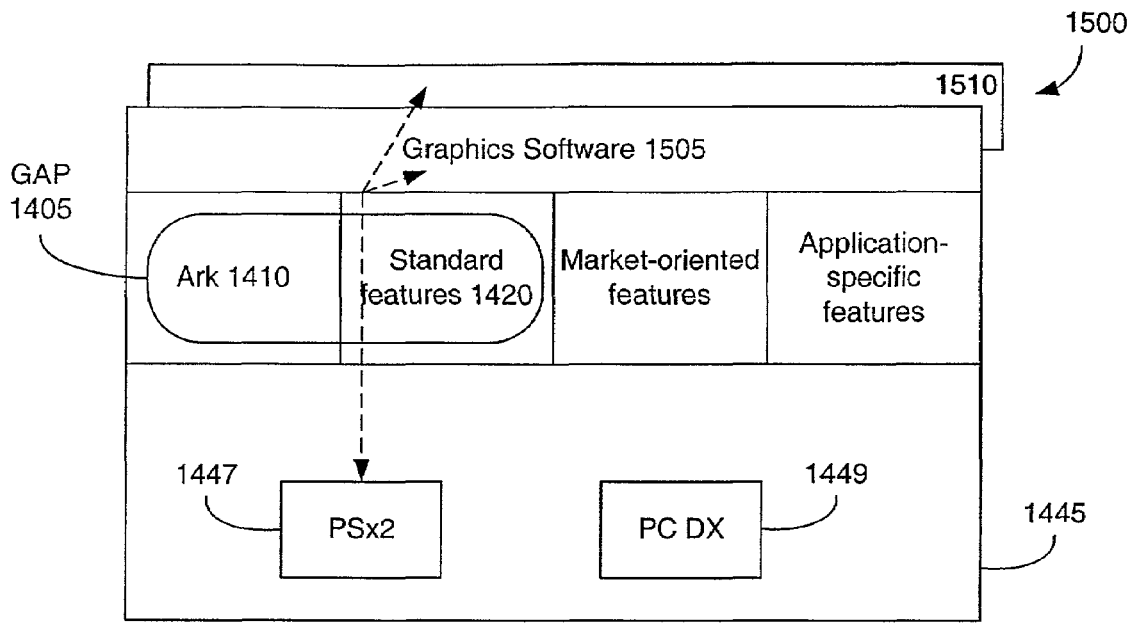
FIG. 15A illustrates the use by a hardware developer of existing features supported by the GAP to allow utilization of the hardware platform by multiple games, according to an embodiment of the invention.
Figure 15B:
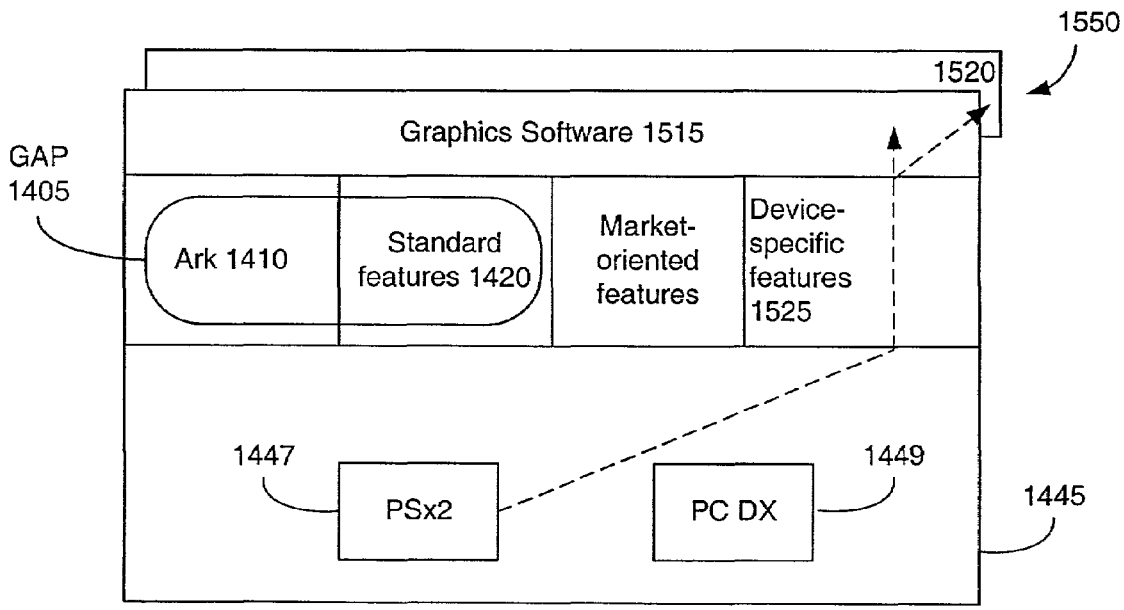
FIG. 15B illustrates the use by a hardware developer of features, specific to the hardware, added by the hardware developer and supported by the GAP, to allow utilization of the features by multiple games, according to an embodiment of the invention.

Note that this flexibility is also available to hardware developers, as illustrated in FIGS. 15A and 15B. In FIG. 15A, a developer of a hardware platform, e.g., platform 1447 or 1449, uses one or more of the standard features 1420 provided with the ARK 1410. This allows different software programs (such as software 1505 and 1510) to execute on the given platform.

FIG. 15B, in contrast, shows the case where the hardware developer uses, instead, one or more of the application-specific features 1525, to allow different software programs (such as 1515 and 1520) to execute on the given platform.

Figure 16:
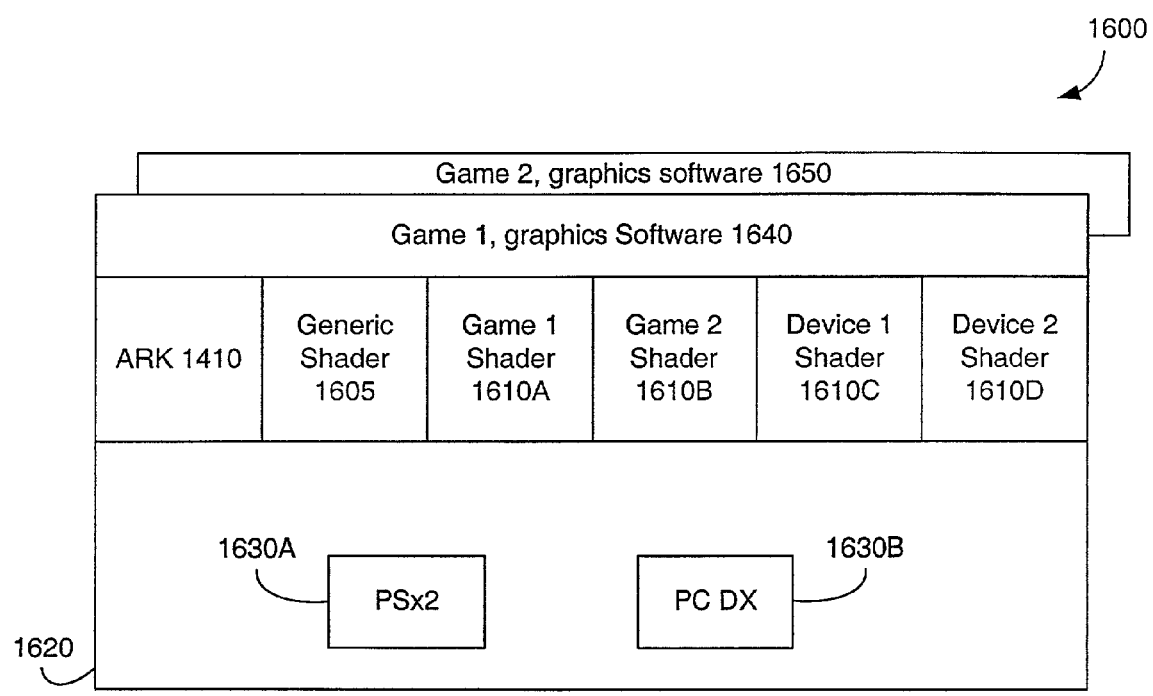
FIG. 16 illustrates a set of shaders, where a specific shader will be chosen at run-time, according to an embodiment of the invention.

FIG. 16 illustrates the availability of different features that perform an analogous function. Here, the function is that of shading. A generic shader 1605 is available as a standard feature. In addition, different shaders (such as shaders 1610A through 1610D) can also be developed as market-oriented features or application-specific features. Different shaders can be better suited to different graphics software (such as games 1640 and 1650). Likewise, still other shaders can be employed for different hardware devices, e.g., devices 1630A and 1630B.

Figure 17A:
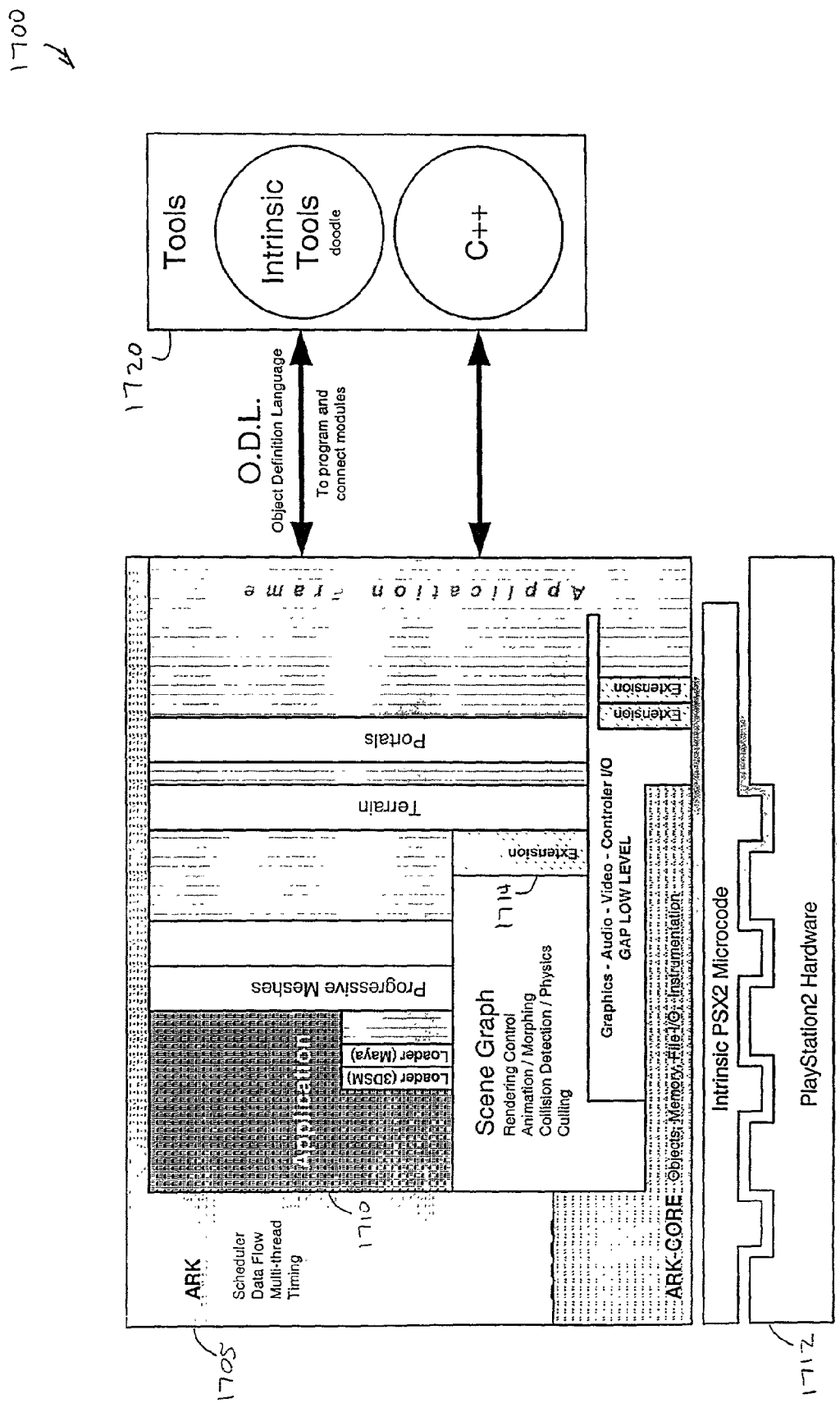
FIG. 17A illustrates an example implementation of the GAP architecture as adapted to a PLAYSTATION 2 platform, according to an embodiment of the invention.
Figure 17B:
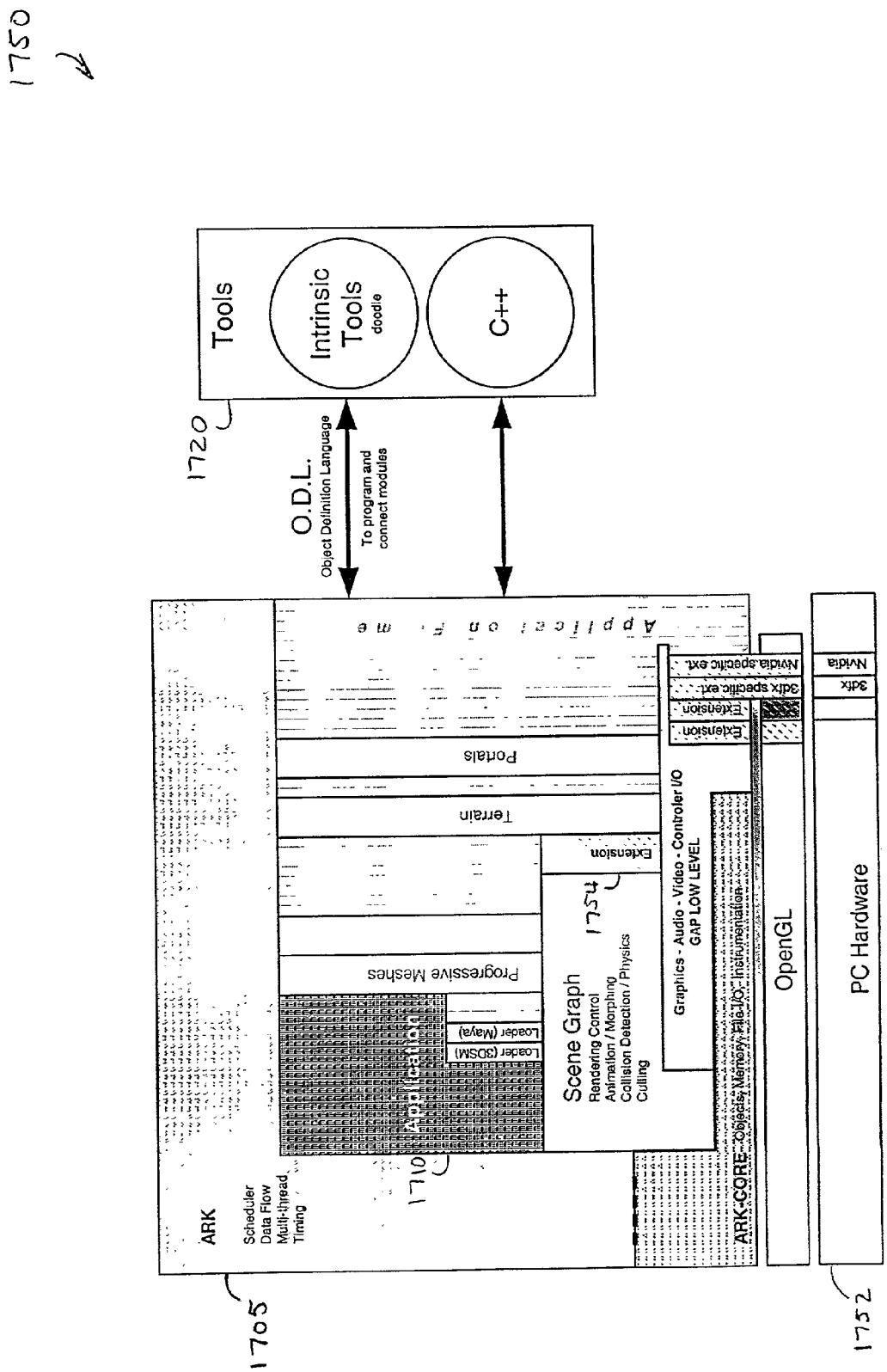
FIG. 17B illustrates an example implementation of the GAP architecture as adapted to a personal computer platform running OpenGL, according to an embodiment of the invention.

FIGS. 17A and 17B illustrate the logical relationship between the ARK 1705, an application 1710, and hardware platforms. FIG. 17A shows the relationship between ARK 1705, application 1710, and hardware platform 1712, a PLAYSTATION 2, in an embodiment of the invention. FIG. 17B shows the relationship between ARK 1705, application 1710, and hardware platform 1752, a personal computer, in an embodiment of the invention. Each figure shows how features, i.e., extensions 1714 and 1754 respectively, can be created by either the software developer (in order to leverage attributes of the hardware), or by the hardware developer (in order to leverage attributes of the software). These figures also show how tools 1720, such as C++ and DOODLE (a product of INTRINSIC GRAPHICS, INC.) can be used to facilitate development of an application.

Figure 18:
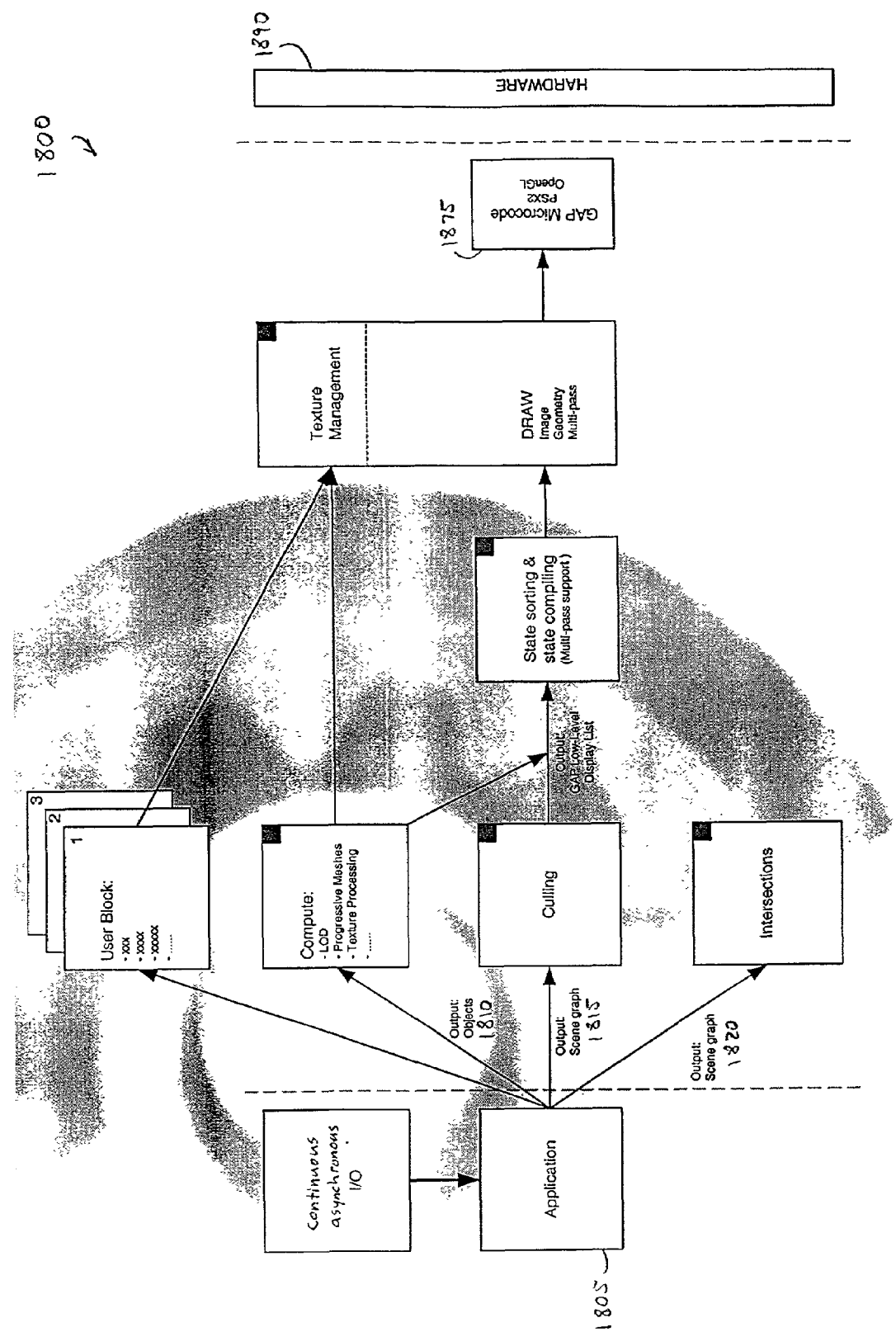
FIG. 18 illustrates a game application template of process flow in one example game, according to an embodiment of the invention.

FIG. 18 shows these relationships from the perspective of data flow during execution. An application 1805 is shown producing output objects 1810 and scene graphs 1815 and 1820. In the embodiment illustrated, the hardware 1890 is eventually accessed via GAP microcode 1885.

D. Understanding the GAP

Before describing the framework application, the components, phases, blocks, connections, and execution semantics, the major elements of the GAP from the framework and application developer's point of view are considered.

1. Blocks

Blocks are the basic elements of the GAP framework and define the "atoms" of interactive visual computing according to the present invention. The term "module" is a general term meaning any of the three classes of blocks: blocks, super blocks, and components. Blocks are built by:

- Creating a GAP block interface definition using a code generation tool, by editing a standard template, or by coding. This definition specifies the type and name of each input and output connection point and every function, which collectively characterize the interface that the block presents to other blocks.
- Binding compiled procedures or interpreter input scripts to the required executable elements of a block. These procedures include a constructor function, an initialization function, a destructor function, and a single procedure as the implicit computation of the block. The block initialization function allocates internal data using special ARK data allocation functions. In an embodiment of the invention, only literal values and dynamically allocated data types derived from intrinsic objects can be accessed over connections.
- Once built, a block is linked into an application or to a higher-level block by constructing connections between its input and output points and compatible points on other blocks.

Executable block content can be C or C++ code interspersed with references to special variables or functions that are in fact references to the data output by other blocks. Sometimes a block contains several other blocks connected into a processing graph. These are termed "compound blocks" and the internal nesting in their definitions is supported to any finite depth. In the future, executable block content may also be scripts in whatever scripting language or languages are supported.

Blocks are the atomic unit of execution within the GAP, and are the level where input and output linkages are attached. The details of connections are presented later, but it is important to understand that in an embodiment of the invention, a block does not know the identity of the blocks that provide its input or that of blocks that connect to its output. Data specified in the block interface definition allows the ARK to invisibly and efficiently implement this run-time dynamic connection facility for compiled blocks.

What defines a block? In one example, shown schematically in FIG. 6, a block includes the following elements:

1. As mentioned previously, each block has a set of input connection points. Each input point has a name and a type. The name is used when making connections to the block and internally as the name by which data available through the input is referenced. The types may be compound data structures represented by C or C++ structures, in which case access within the block can be to "member of name" in addition to the aggregate "name," though the syntax for this is currently undecided.
2. Blocks have a set of output points, each of which also has a name and type. These names must be distinct from each other and from the input names within the block. Each output point corresponds either to an internal data member of the block that is derived from the intrinsic object base class and allocated at run-time, or to a member of such an object. Access to these internal objects is provided to other blocks that are connected to the corresponding output points.
3. Blocks may have a set of internal intrinsic objects that are not shared via the output points, and may have a set of other internal objects not derived from the intrinsic object base class. Objects that are not derived from the intrinsic object base class may not be shared through connections, and only objects derived from the block base class can have connections.

Finally, each block can contain one or more functions. The construct( ), destruct( ), and initialize( ) functions provide object lifetime services while the evaluate( ) function implements the processing of the block. In natively compiled blocks the ARK invokes a function via subroutine call whenever the block is to be executed; in interpreted blocks a registered interpreter is invoked with the body of the evaluation function as the function definition.

2. Standard Blocks

Figure 5:
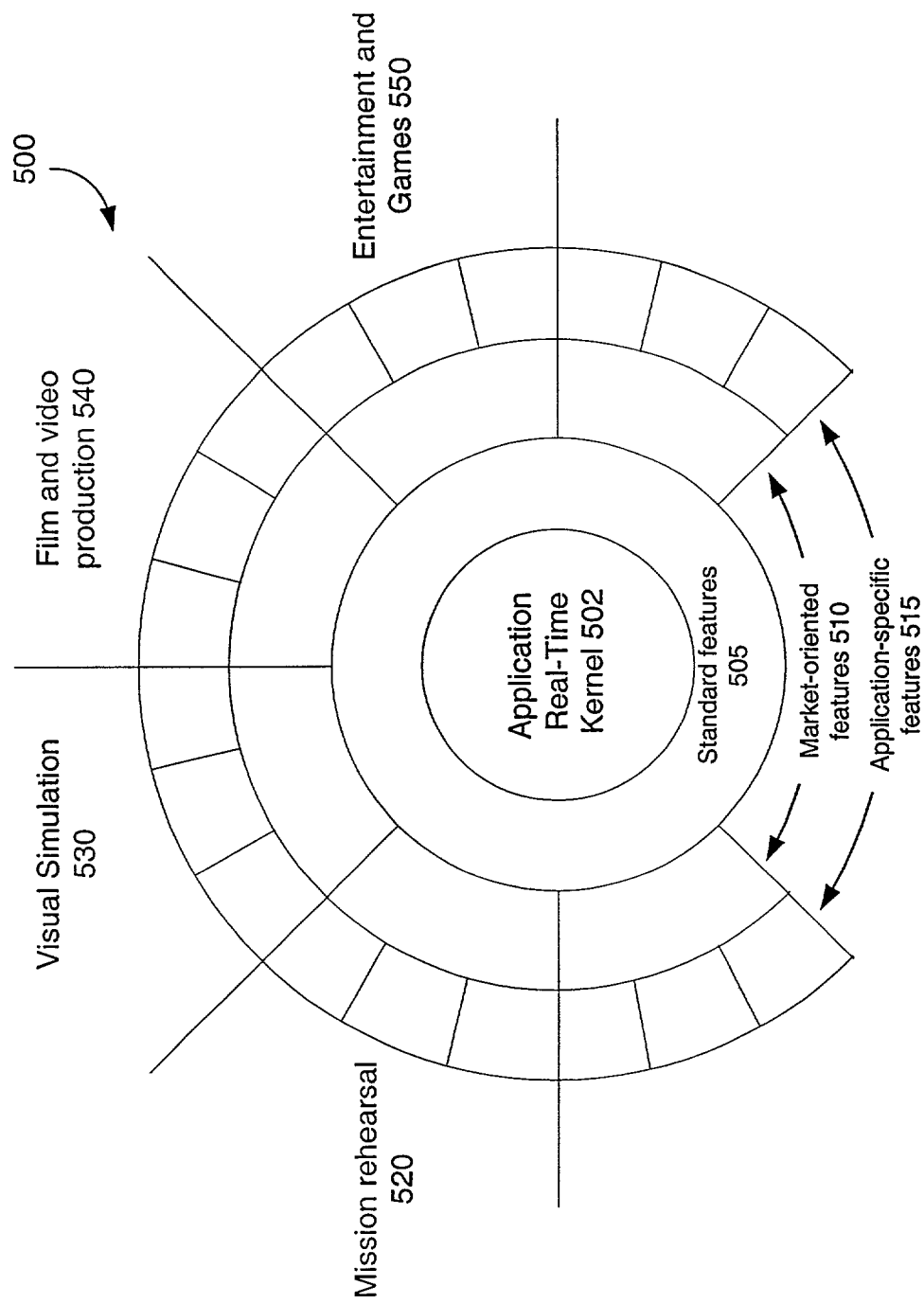
FIG. 5 illustrates the structure of the GAP, according to an embodiment of the invention.

The taxonomy of GAP blocks has three broad families: blocks that implement the ARK and GAP infrastructure, blocks that represent global resource managers for hardware and public data structures, and blocks that provide application-level features. Application-level features are further subdivided based on the breadth of their developer audience: standard blocks that are usable in many applications, market-oriented blocks for wide use within particular industries, and application-specific blocks implementing the details of a particular application. FIG. 5 illustrates this segmentation. The ARK-related infrastructure and resource manager blocks are not shown separately; they are included as elements of the ARK (502) itself.

The following describes blocks of each category, along with exemplary functions:

1. Infrastructure blocks. Manage processes, threads of control, and physical processors. Implement the block interface semantics. Provide mutual access exclusion, explicit data sharing, and implicit data privacy. Implement time of day clocks and high-precision real-time clocks, counters, and timers. Perform data movement, such as memory transfers and asynchronous disk access. Support dynamic binding by loading and unloading components during GAP execution. Efficient low-level parallelism-aware queue, stack, list, and array data structures. High-level public data structures, including the scene graph, the working set, and the image cache.
2. Resource Manager blocks. Access and allocation of physical resources like multiple processors, graphics pipelines, display channels, texture resources, frame buffer storage, and memory. Report data about capabilities, capacities, status, and performance.
3. Standard Feature blocks 505. Abstract device management for human input devices, such as keyboards and joysticks. Attribute morphing, interpolation, deformation, and evaluation. Spatial audio processing. Activity logging and playback. Configuration file parsing and evaluation. Coordinate system processing, including precision management and catenation. Culling of sounds, visuals, intersections, and animation. Implicit database paging of objects, shapes, textures, materials, and sound.
4. Market-Oriented Feature blocks 510. Universe model supporting ephemeris time; geo-referenced temporal positioning; solar, lunar, and planetary position and appearance; and, visualization of the star-field and constellations. Height above terrain, line of sight intersection, multi-point terrain following, collision detection, and object intervisibility determination. Atmospheric model with patchy layered fog, horizon haze, scud clouds, dynamic cloud volumes, directional horizon glow, rain, sleet, snow, and underwater effects.
5. Application-Specific Feature blocks 515. These are the blocks that a developer writes to reshape the GAP into a particular application. For an demo showing a view of the earth from space, this would include motion models, command line processing, environment variable processing, graphical user interface customization, application-specific database loading and decoding logic, the splash screen, and the ability to spawn a browser for linkage to a web site.

The ARK 502 and standard feature blocks 505 together are the GAP; the GAP, when combined with an industry's market-oriented blocks 510, defines a market-oriented development and deployment platform; and, finally, the GAP along with market-oriented feature blocks 510 and a custom collection of application-specific feature blocks 515, defines a complete application.

Application-specific feature blocks 515 and market-oriented feature blocks 510 collectively can be oriented in one or more application areas. Examples include the mission rehearsal area 520, the visual simulation area 530, the film and video production area 540, and the entertainment and games area 550.

The GAP implements a new level of program reuse between applications by providing a very high level structure to define the interrelationships between application components that can then be automatically "reconfigured" at run-time to produce an executable application that is well-tuned and structured for the details of the hardware platform. This allows hardware-related blocks such as those related to graphics, video, audio, computation, and networking to be substituted by hardware providers via feature-level "device drivers" allowing the fielding of real-time applications that are both portable and differentiated. This is a significant advantage for application developers building advanced graphics applications for PC and other diverse hardware platforms, including cable set-top boxes and enhanced televisions.

Consider the infrastructure, resource, and standard blocks to be the initial instruction set of the "GAP virtual machine"

or the system services of a "GAP operating system." Market-oriented blocks can extend this core instruction set by adding the features of target markets. They are packaged separately but are used in exactly the same way. Blocks representing features and resources are woven together with connections to form the framework application that developers can modify and extend. This modification process is discussed later, after the linkage between blocks has been explained.

3. Defining Block Interfaces

Interfaces are the "cell wall" separating a block or component from the outside world. They are a public definition of a block's input and output connections that serve as named targets for connection construction. They also specify functions within blocks. Interfaces are typed and types must match for connections to be made. For type-safety and data integrity, each input and output point also has a specific type that a potential connection must also match for the link to be consummated. Output points also privately specify the identity of data internal to the block that is accessed by links to the output point. Input points specify (either explicitly or implicitly) what local variable or accessor function corresponds to reading and writing data flowing into a block via an input connection.

Macros can be used to access block inputs so that block construction and ARK implementation can proceed while further consideration of interface implementations is conducted. This macro approach also allows alternative techniques to be tested without requiring blocks to be rewritten. This macro approach allows different data binding mechanisms in different GAP implementations.

4. Connections Between Blocks

A single connection can be established from each block input point to a compatible output point of any other block.
1. The word "single" in this definition means that fan-in cannot be specified at an input attachment point.
2. "Compatible" refers to interface compatibility and data type compatibility. The interface definition names (or identifiers) must match and the endpoint data types must match. A character string output cannot be connected to a floating-point input, for example.
3. Finally, allowing "any" output point as a destination means that arbitrary fan-out at output attachment points is supported.

It was mentioned earlier that components were super-block "factories" and can be used where blocks are used. In the connection context, the difference is that, in an embodiment of the invention, components can only be connected to resources, which are blocks advertised as designated connection points for components. Many properties of connections are explained by visualizing them as one-way pipelines where data flows from an internal intrinsic-object-derived data member through an output point of one block, the producer, downstream to an input point of another, the consumer. An alternate view interprets connections as access by a downstream block to the internal data of an upstream block. This approach more clearly expresses the capabilities, limitations, and semantics of the connection architecture.

Connections are created at run-time and can be made and broken during execution. For example, moving an eye point through a scene may cause the geometry-paging feature to load a new animation component along with newly paged geometry. The incoming animation block would need to be attached to the camera position resource and the connection would be made as described above. Once connected, the camera position output data from within the block owning that information is available within the newly loaded block when the internal accessor functions or representative variables associated with the block's input points are respectively invoked or accessed.

Together, blocks and connections provide the special abstraction required for building the GAP. They implement a means to specify the arguments for subroutine invocation through a general connection topology that allows changes to the connection topology after the functions have been compiled. They also support efficient transport of data along connections by exchanging indirection handles rather than copying data.

In an embodiment of the invention, what happens behind the scenes is much more sophisticated than it may appear at first glance. Presenting blocks with this clean dataflow programming model above an arbitrary multiprocessing topology is a fundamental design constraint within the ARK. Much of the complexity in the ARK and the object model underlying all GAP-related data types exists to create the illusion that connections work as described above while being extremely efficient and supporting:

- Coherent access to data shared between concurrently executing blocks.
- Seemingly sporadic generation or consumption of data between blocks that operate asynchronously or synchronously at differing rates.
- Temporal coherence for time-serialized processing pipelines where megabytes of data must appear to flow through connections with several frames of data in-flight at once.

Making and breaking connections between blocks can be infrequent events while the amount of data accessed over connections can be in the hundreds of megabytes per second, so an implementation should always prefer faster accesses even at the expense of slower connection construction.

Connections are a critical element of the GAP environment in an embodiment of the invention. They are the mechanism through which blocks can maintain efficient communication while supporting flexible reconfiguration of the interconnection topology at and during run-time. This facility is the basis of "run-time application optimization through reconfiguration" which is provided to GAP-based application developers through add-on blocks provided by software developers and hardware manufacturers.

5. Packaging Blocks as Components

Components are the highest-level objects in the GAP environment. They represent a factory for generating new collections of blocks based on an iterative global resource allocation process. They are designed to wisely answer questions of the following form: "what should be added to the standard framework to insert a particular feature, given that I have a particular hardware configuration and constraints on available resources?"

This is a difficult question to answer because it depends on both local and global information. Locally, several available implementations of a feature may be chosen based on constraints, such as the availability of hardware or other resources. Globally, one implementation may be preferred to another in order to avoid overuse of a critical resource or to optimize based on application preferences, such as image quality or rendering rate. For example, if features A and B can be implemented using either more memory or more processing, then one implementation of each would be chosen so that total memory use and total CPU use both fit within available resources with the particular choice based on resulting frame rate.

Components are the packaging of implementation wisdom in a computer selectable bundle. They are what enable developers to reuse previously written software in new applications with confidence that the right "variations" will be made in the implementation of reused features.

Structurally, a component is a container for one or more alternate implementations of a feature. This highest-level representation is illustrated in FIG. 7, where a component 700 contains a list of alternate implementations 701A through 701*n*.

FIG. 8 diagrams the contents of a single alternate implementation 701A. Associated with alternate implementation 701A is a list of resources 805, such as system memory, texture memory, CPU requirements, and data-transfer bandwidths that are required to successfully instantiate the particular implementation. List 805 can also contain information used to reduce these requirements when a resource negotiation is necessary and possibly expand the requirement when resources are abundant. Each required resource also has resource negotiation information; this information supports the consumer-side bargaining in subsequent negotiations over resources.

Components may also introduce resources into the system, and so alternate implementation 701A includes a list of resources 810 that are provided by that alternate implementation. Each newly created resource also has resource negotiation information; this information supports the supplier-side bargaining in subsequent negotiations over the new resource. Finally, alternate implementation 701A contains a list of super blocks 815. The super blocks 815 are the actual implementation. Each is tied to a particular phase of execution in the application framework and provides a list of blocks to be executed in that phase.

After the components in an application have been identified, each is asked about its resource requirements; the answer is the list of the alternate implementations and their required resources. Aggregating these requirements creates a multidimensional resource allocation problem that is solvable if at least one configuration of alternates fits within system limits.

When a single solution exists, the chosen alternative is communicated to each component which then instantiates the corresponding implementation with links into and out of the component, becoming links into and out of the blocks of that implementation.

When more than one combination of alternative implementations fits within resource constraints, then the chosen configuration is based on weighting parameters contained in the component definitions and on evaluation equations provided by the application developer. This preferred solution is then communicated with the components which instantiate the chosen alternatives and link them into the framework.

If resources are oversubscribed then there is no direct solution, and the system enters a negotiation phase in which each block is asked which of its resource requirements can be reduced and what the penalty would be for making such a trade-off. A typical example would be texture memory resources that could be reduced by one-fourth at the penalty of blurry images. Another example could be minimization of system memory resources by incremental paging rather than fully pre-loading data at the expense of extra CPU utilization and data transfer bandwidth consumption. Negotiation continues until an acceptable configuration is found whereupon the components instantiate the proper alternative implementations with reduced resources, or, if there are too many "strong-willed" components in a constrained environment, until it is found that no solution exists. In this dire case, either a component is removed and the process restarted, or the process exits.

The resource allocation process assures that no component's implementation is instantiated unless all necessary resources are available and that an appropriate decision about which of several alternatives is chosen in response to available resources. For example, in an embodiment of the invention, the universal texture component will have one implementation that relies on a "clip-map" resource, provided only in SGI implementations, and one that does not; in the first case the implementation can take advantage of SGI InfiniteReality hardware, and in the other a general software version will be employed.

Components may also introduce resources into the system. In some cases these new resources manage physical resources but in others they will represent attachment points for other blocks. For example, if a morphing component is attached, it would be useful to also advertise just-before-morphing, morphing, and, just-after-morphing attachment points so that other components may attach to these whenever morphing is in use. As a subtlety, note that such "component on a component" attachments only make sense when the first component is present; this means that it is not always a problem if a component is not loaded because of a missing resource. It may just mean that a planned-for contingency did not materialize in the application's configuration.

6. Phases and Stages of Execution

The application framework defines several phases of execution, which correspond to threads of potentially parallel execution. Each alternate implementation within a component is comprised of one or more super-blocks, each associated with a single phase of processing. Super blocks may also define new phases, such as a morphing phase in the case of the previous example. As the super blocks of the selected alternate implementation of each active component are instantiated, they are associated with the specified phase as well as being linked to resources by connections.

As shown in FIG. 9, the result of instantiating the desired components is a list of phases. Associated with each of phases 905 through 925 is a list of zero or more super blocks. Many of these lists may be empty. For example, the list for the database-paging phase 910 will be empty if an application suppresses the standard database-paging component without defining a replacement. Each non-empty phase list (905 and 915 though 925) defines a potentially concurrent phase of the application. These phase lists are indicated in FIG. 9 with respect to one example application framework.

FIG. 10 illustrates how phases that are not empty are then mapped to stages of execution. Each execution stage represents a collection of phases that the ARK will execute in a single thread. Stage 1005, for example, represents initialization phase 905, geometry morphing phase 915, and culling phase 920. Stage 1010 represents drawing phase 925. Algorithms for producing the phase-to-stage mapping are known in the art, and range from the simple "all phases mapped to a single stage for single-threaded sequential execution" to the "each phase mapped to an independent stage for maximal concurrency."

The resulting stages of execution are then prepared for execution by generating an execution order list that arranges the pair wise block orderings imposed by connections into a total ordering of the blocks in the phase's block list. The ARK, as described later, iterates through these lists and invokes the evaluation( ) function of each referenced block.

Stages provide a simple expression of a very complex notion: multiple "main loops of control" within a single application, where the loops execute at different rates while still reading and updating shared data.

7. Sequential and Concurrent Execution

Preparation to execute an ARK-based application includes loading the components listed in the application manifest. The manifest lists each of the user-developed, third party, and market-oriented blocks needed at the top-level of the application. After loading, these components participate in the resource allocation, implementation instantiation, and phase-to-stage mapping processes described previously. Compound blocks consisting exclusively of links to other blocks are recursively expanded by instantiating their sub-blocks and links and making the connections indicated by their definitions. At the conclusion of these tasks, the definition of each stage of application execution has been produced; each with a block execution order list and a corresponding set of blocks and constructed connections.

The execution order list resulting from this preprocessing is an input to the ARK and the evaluation of such lists is the basic task of the ARK. FIG. 11 indicates this structure with a single ARK thread manager 1105 executing an execution order list 1110.

In the sequential execution environment, a single ARK thread continuously iterates over the execution order list 1110, selecting and executing some or all of the blocks 1115A through 1115n during each pass. Partial execution is for cases where blocks run at different rates. For example, if some run at 60 Hz (such as block 1115A) and some at 30 Hz (such as block 1115B), the ARK would iterate at 60 Hz but choose the 60 Hz blocks all of the time and the 30 Hz blocks half of the time.

Simple blocks represent the finest-grain of potential concurrency from the developer's point of view, but as described above, it is actually the execution order lists that are the true atomic elements of execution. This results from the fact that each block is referenced by a single block execution order list and it is blocks, rather than particular functions within blocks, that are scheduled by the ARK and executed by a potentially concurrent ARK thread.

Concurrent execution is a more sophisticated case where there are multiple ARK threads each with its own block execution order list, as indicated in FIG. 12. Supported concurrency modes include multiple threads (such as ARK threads 1215 through 1225) on a single processor 1210 (known as multi-threading or multi-programming), a single thread such as thread 1215 on each of multiple processors 1210 and 1250 (termed multi-processing), and arbitrary combinations of multi-programming and multi-processing.

In concurrent execution there are multiple independent block execution order lists 1260, one list per ARK thread. Converting the flattened application graph into multiple lists will cause some of the connections between blocks to span an ARK thread boundary, with the upstream and downstream blocks in different lists, which has significant implications for shared data. This case is invisible to block developers.

Neither the links between blocks or the presence or absence of data on such links drives or inhibits the execution of blocks. Block execution is controlled by the execution order lists, which are made either before or during execution and which can change during execution. There is a significant distinction between the "data flowing over dynamic connections between blocks" structure of the GAP and the "execution controlled by presence of data at block inputs" nature of pure dataflow architectures. The GAP is more like an "embedded application-level operating system" that executes blocks by following one or more block execution order lists produced by a scheduler block (or by static analysis prior to execution.).

The GAP provides the ability to write programs that automatically and efficiently expand to use available processing resources without developers needing to explicitly architect for concurrent execution. It also provides concurrency with a real-time orientation. These are advantages of the GAP compared to other platforms and programming environments.

III. Application Development

A. Application Graph

The Application Graph is the fundamental expression of an application and/or pieces of an application to the Application Real-time Kernel. The ARK uses this graph to execute the application as if it were a virtual machine based on the data and processing flow described in the graph. This application graph consists of processing blocks, data interfaces, and data connections. Organizing the application in this way is in many ways orthogonal to normal object-oriented programming model. The ARK does not dictate the data structures used throughout the application nor the implementation of the processing components. However, it can force developers to define more of the application explicitly and thus enables the kernel to manage the data flow and processing of the application, making many optimizations inherent in understanding the application in its entirety at this level of design.

B. Components

The ARK also defines a packaging and run-time management semantic for the process of inserting functionality into the application graph. This semantic is based on the notion of a component. Components are feature level packaging of functionality. The ARK contains not only the current application graph it is responsible for executing, but a run-time definition dictionary of processing elements and interfaces that can potentially be used in the application. Components are able to extend existing definitions and add new definitions to this run-time dictionary. Components are also used to negotiate resources such that they can control how they are inserted into the system based on what resources are available to them. Correspondingly, the ARK's run-time resource management and performance monitoring is broken down based on these same feature-level components. The ARK allocates resources with regard to the component making the request. The ARK can also track the components' usage of those resources (memory, time, processing, bus bandwidth, et cetera). Thus to the kernel, components are much like processes are to a complete operating system—they are the granularity of resource allocation/monitoring. However, because of the knowledge of how the components interact (via the application graph), the ARK kernel can act as a more intelligent component moderator.

Instead of having very little knowledge of a bunch of unrelated tasks, the ARK has knowledge of how many components fit into a specific overall application structure.

C. Component Dictionary

Because the ARK must maintain the overall understanding of modularly written and configured applications, it maintains a complete dictionary of application graph concepts. This dictionary is able to define segments of an application based on several structures that make up the ARK application graph. These structures include processing blocks, data interfaces, data connections, and data objects. The definitions of these structures can themselves be modular. In fact, developers of the ARK-based application machines can define their application by laying out data interfaces and connection points within an abstract 'basis' processing block. The ARK needs to be able to assemble all of the structural definitions, partial extensions, full extensions, and functional replacements into clearly understood application graph definitions. Further, it needs to allow these application definitions to be configured at application runtime. Thus dictionary operations include the definition of simple blocks, data interfaces for blocks, connections connecting blocks of like interfaces, compound blocks, and basis blocks.

D. Processing Blocks

1. Blocks in General

Processing Blocks contain atomic processing that happens within the application graph. Processing blocks have input fields, internal storage fields, and output fields. Input fields are, in general, read-only and are updated automatically by the ARK. Internal storage fields are read/write and are updated only by the block itself (in general) via normal C++/C field access. Output fields are just shadows of either input fields or internal storage fields such that the ARK can manage propagation of the outputs without direct interaction with the block. The only communication between blocks is via its inputs and its outputs. However, blocks also are able to interact with the ARK's resource manager to negotiate over resources used within the block. Such resources include block processing time, memory allocation, bus utilization, and other resources that are defined in the Resource section of this semantic definition.

Blocks define several functional interfaces. These interfaces consist mainly of initialize, initializeOutputs, reset, and evaluate functions. The ARK uses the initialize function to have the block allocate it resources. It uses the initializeOutputs function to have the block define to the ARK the storage for the block's output fields. It uses reset to reset the internal state fields of the blocks to a well-defined default. It uses the evaluate function to have the block perform its processing—processing based on its inputs and current internal state fields.

Block scheduling is performed by the ARK. This schedule can be simple and deterministic but can be related to the data available at ports/connectors. Most blocks are scheduled by simply linearly walking from the inputs of the current application graph (which is hierarchical) through the application graph, scheduling blocks whenever their inputs have refreshed 'enough' data. The concept of 'enough data' is defined by the inserting component that relates the block's scheduling to data availability at the block's inputs when inserting the block into the graph. This level of scheduling allows for looping constructs, work lists with chunk sizes, and straightforward pass through execution; however, it may not allow for arbitrary scheduling based on recursion or stack based block execution.

2. Simple Blocks

Simple blocks are the leaf processing nodes in the application graph hierarchy. Simple blocks have an evaluation function that is executed whenever the ARK schedules the block. Simple blocks can be viewed as scheduling points for processing of typed data flowing through its inputs and outputs.

3. Compound Blocks

Compound blocks are a self-contained section of an application graph that is encapsulated into one block. This means that the block has as its inputs the inputs of the graph contained within it. It has outputs corresponding to the outputs of its contained graph. From the level above, a compound block can be scheduled as a simple block—atomically, based on data availability at its inputs.

4. Basis Compound Blocks

Compound blocks also contain name space. This name space is used to create data hitch points for data flowing within the compound block. These data hitch points are named inside the compound block and provide a plug-in mechanism for components to add functionality to a block that has a predefined 'basis' structure. Any compound block can become a basis block by adding named connectors to its internals. These connectors define the semantic for the compound block itself in terms of the data and processing flow. They also provide potential buffering, making the configuration of processing, scheduling, and configuration largely orthogonal to the implementation and design of the processing blocks themselves. The idea here is to put the power in the hands of the original developer of the basis block who is defining how the compound block will function and what types of extensions it can handle.

5. Phases

Compound blocks that plug directly into the overall application (the highest level compound block) are called phases and are specialized basis compound blocks. Phases are singled out in the system of compound blocks for several reasons. First, they provide the level of desired configuration granularity of the overall application. Second, they provide the desired level of plug-in granularity for components wishing to extend or replace application-level features. Third, they currently act as the level of granularity with which the ARK can use threads. Each phase can be configured to map to an individual thread if necessary.

6. Stages

Stages are groupings of phases that are mapped to a particular thread. At one extreme, there will be a one-to-one mapping between phases and stages, making ultimate use of available processors and underlying context switching. At the other extreme, there is only one application stage—this one executes all of the application phases based on the same simple scheduling algorithm defined for compound blocks. Stages essentially contain a main loop of synchronization, communication, and conditional execution of the phases.

7. Block Summary

Blocks are used to describe atomic processing that happens within an ARK-based application. The scheduling of the processing is done explicitly based on ARK semantics. This is very different from the implicit cooperative stack based control flow used in applications developed with current programming systems. The explicit nature of ARK-based processing can lead to more deterministic applications in terms of real-time interactivity and performance. It further allows for optimizations based on a high level understanding of the intent of the application.

Blocks are fundamental building blocks of the ARK. They are themselves hierarchically defined. This definition yields to a view of an application as a recursive compound view of a processing structure with inputs and outputs. The entire application is, in this way, one large compound block with inputs and outputs. Further, the application is broken into functionally separable pieces with well defined interconnects (phases). Theses separable pieces are compound blocks themselves and can be configured and instanced in different ways. Further, these separable pieces are themselves compound blocks with their own structure defined in terms of processing and data flow.

E. Data Interfaces

1. General Description

The ARK dictates that all communication with the application happens via explicitly defined data interfaces. These data interfaces differ substantially from the stack-based functional communication mechanism provided by many current programming systems. Data interfaces have access to typed data where the 'provider' of the data on the interface (a processing block) and the 'user' of the data (another processing block) do not directly interact or have knowledge of each other. Yet, despite this 'abstract' data interface, blocks can be connected directly (in implementation) and are often able to expose internal data without passing that data on a stack via a virtual or non-virtual function call. This type of fast direct access is manageable because of the ARK's knowledge and scheduling of processing blocks within the overall graph.

Designing an ARK based application includes the definition of its data interfaces. In normal functional programming, code modules are broken apart and functional programming interfaces are defined to abstract their interaction. In object-oriented applications, this abstraction is further broken down according to the nature of individual 'objects' within the overall application and according to how those objects can interact with each other abstractly. In ARK applications, rather than defining the application based solely on its functional or object structure, the application is described in terms of the data interfaces available at various places in the overall application structure. These interfaces represent interaction points and, although they describe data flow, provide an inherent structure for the processing blocks that will connect to the interfaces. Once again, this level of description takes the flow of data out of the implicit realm of individual system objects or modules and makes it explicit and configurable at a higher level. In effect, these interfaces allow for applications objects/modules to hook into interfaces in many different parts of the system while still interacting in a way semantically consistent with the overall application structure. Thus, data interfaces provide an overall feature driver model for entire applications. Individual components of the system interact across agreed-upon data interfaces while understanding only the data interface itself and caring nothing of the block or blocks on the other side of the interface.

2. Pins

The ARK defines the applications data interfaces at several levels. The lowest level of data interface definition is called a pin. Pins are defined to represent access to an atomic field being sent or received by a block (coming from or going to another block). Pins therefore provide a data interface corresponding directly to fields within objects (e.g., integer, float, object handle, vector). Pins are separated into two types—inputs and outputs. An input pin must be connected to an output pin or its value is undefined. Input pins are accessed much like internal fields during a block's evaluation. In fact, the basic notion is that the ARK assures that a block's input pins all contain valid data when the block executes. Output pins have slightly different semantics however. Output pins must have corresponding fields in the block or one of the block's contained objects. The ARK is responsible for passing on output pin values without interaction from the block. This means the ARK must have a field-to-output pin mapping for each output pin. To summarize, when a block executes, the ARK makes all of the block's inputs valid and available. When a block finishes executing, the ARK conceptually pushes the block's outputs across to other inputs that are connected to them. In implementation, this merely means that the ARK allows other blocks connected to this block's outputs to sample those data values at semantically appropriate times.

3. Ports

Pins can be grouped together to form a description of a higher level of data interface called a port. Ports are hierarchical in nature and provide a polymorphic type system for complex pin groupings. Ports are defined as a list of pins and other ports. Ports are first defined via a port type system before port instances are created. This allows for standard port types to be defined and used by multiple developers who seek to attach their individual processing blocks via a standard interface. These port types can also be used by connectors to have not only a standard interface but also a standard point in an application where that interface exists and has particular meaning. Port definitions are run-time extensible and are polymorphic. Ports represent a way of hierarchically grouping pins together in a standard way—much like creating standard sockets in the hardware world.

4. Pin/Port Interactivity

Pins and ports are normally simple and automatic. The ARK is responsible for propagating data from output pins/ports to connected input pins/ports. The propagation normally happens automatically inside of the ARK and what minimal setup the ARK does is carried out in internal ARK wrapper functions that surround a block's evaluation. However, in an embodiment of the invention, the ARK allows for 'interactive' ports/pins to be defined. Interactive ports/pins are able to ask the ARK to 'pull' new data in for processing or 'push' data out for processing. This interactive push/pull semantic allows the flexibility to create blocks that interact with the application or each other in a more fine grained way. Note that interactive pins/ports require data buffering and can only be used by ports that are connected to buffered connectors that will be described later in this section.

5. Data Connections

Data connections are connections between one block's input pin/port to another block's like-typed output pin/port. In an embodiment of the invention, the ARK provides only one type of connection—the simple connection. Simple connections provide safe direct access of an abstract interface between two blocks. Simple connections represent simple data flow via a copy-by-value semantic between two pins/ports. However, the implementation of simple connections is better described with an electrical analogy. In this analogy, inputs are really connected electrically to another block's outputs. Thus when block B's input is connected to block A's output, block B's port effectively samples the actual data in block A when it samples its input pin. This is only safe because the ARK makes sure that block A and B are only executed in a semantically consistent fashion and even takes care of multi-buffering block A's data in the case where A and B are evaluated in different threads.

6. Data Connectors

Connectors are hub-like hitch points for data. There are two types of connectors.

Simple Connectors

Simple connectors act like a dual sided port that exists inside of a compound block separate from any of the blocks that will connect to it. The important thing about simple connectors is that they provide pre-defined name space for components to be developed independently and still interact. When components add functionality to a basis block, they do so by inserting blocks and connecting the ports of those blocks to pre-existing connectors. Thus, the connectors provide the overall structure of the compound block and define the interfaces that intrinsic developers will use to communicate.

Buffered Connectors

Buffered connectors provide not just structural name space, but also provide extra semantics for data flowing through them. Buffered connectors are able to support both fan-in and fan-out of data flowing through them. Further, buffered connectors can be used as work queues and data routers. Buffered connectors allow for data hub connection points that allow modular and configurable application components. They also provide definition for the structure of the application as expressed to the ARK. However, buffered connectors can have run-time cost. Buffered connectors must have storage for the data that they buffer. Further, they can support several simple data filtering and routing options to allow application phases to be extended, replaced, and configured. Buffered connectors are useful for allowing fan-in by sequentially providing each data element to the downstream block. Buffered connectors are also useful because the ARK allows blocks to be scheduled based on the number of elements available in the connector's buffer. Thus simple looping constructs can be implemented for high level pieces of work/functionality. This also allows processing blocks to be simplified to work on sets of inputs while the ARK will schedule them iteratively based on inputs available in the current configuration. Buffered connectors are also useful for event-driven multi-threaded (cross-phase) inter-block communication.

7. Data Interface Summary

Data Interfaces are fundamental to the ARK. They allow code modules to interact efficiently inside of a real-time application using an abstract interface. The lowest level interfaces are atomic field interfaces, i.e., pins. Pins can be grouped into a hierarchically typed structure, i.e., a port. Pins and ports from different blocks can be connected together via simple connections. Connections are semantically simple in that they act as pass-by-value data connections. Data interfaces can exist separately in the application as name space. Such an interface provides symmetric input/output typed data and is called a connector. Buffered connectors allow for more advanced data interaction between processing blocks while still expressing the intent of the application to the ARK.

F. Object Design Language (ODL)

1. ODL Overview

The ODL, according to the present invention, lets developers describe the structure of their programs in a simple, straightforward way. This high level description can be used to realize the program in a way that achieves a higher performance than the mainstream languages and functions on multiple hardware and software platforms.

Libraries, applications, and the objects contained within them are expressed in the ODL. The state information in the objects is expressed in an abstract way so that memory and data transfer can be managed using methods that are tuned for a particular platform. In addition, information can be provided through the ODL to enable other kinds of optimizations.

The ODL, in the embodiment described herein, uses the syntax of the Scheme programming language because it can describe arbitrarily complex structures in a straightforward way, it is easily extended with new semantics, it is readable by humans (provided that it is reasonably formatted), and it is easily and quickly parsed by the computer. Also, it is familiar to many programmers and is supported by many text editors.

2. Glossary

A glossary for terminology in this section is provided here.

Object: An entity that contains state information, which is structured as encapsulated fields of different types. Depending on the types of fields an object contains, it can be connected to other objects, flow between objects in a dataflow program, and be manipulated by a procedural program (e.g., one written in C/C++).

Object Element: A part of an object. An object element typically has a name and holds state information some type. The different kinds of elements are described below.

Interface: An element that is used for input or output of data into or out of an object.

Field: An element that holds state information of a certain type.

Basis: An element that defines an object (the "basis object") to be used as the basis, or foundation for extensions. The object acquires all the elements of the basis object.

Extension: An element that defines an object (the "extension object") to be added. The object acquires all the elements of the extension object and hooks its connections (defined below) to the existing connectors.

Connector: An element that acts as a place to make connections (defined below). Connectors are typically used inside objects that can be used as bases; their purpose is to establish fixed points to which extensions can connect.

Connection: An element that serves as the link for the transfer of data between two objects. A connection connects a source of data (a field or an object output) to a consumer of data (an object input).

Series: A special kind of connection that connects in "series" with a connector. The purpose is to allow the data that flows through the connector to be processed in multiple, independent ways.

Block: An object that has at least one input and/or output element and thus can be connected to other blocks in a dataflow program. A block that contains only an evaluate function is referred to as a "simple block." All others are called "compound blocks" because they are internally comprised of other blocks.

3. Dataflow Object Syntax

In this section, curly brackets denote values to be filled in. Square brackets denote items that are optional. An asterisk denotes zero or more of the items preceding it.

General Syntax

All ODL keywords are case-insensitive. Object names, however, are not guaranteed to be case-insensitive because some languages (notably C and C++) are case-sensitive.

Scheme-style comments are supported: A comment consists of all characters between a semicolon and the following carriage return.

Object References

There are two types of object references: a limited (normal) object reference (ObjectRef) and a complete object reference (ObjectCRef).

The ObjectRef operator lets an object definition reference another object definition. Only the public elements of the referenced object can be accessed. The parameters to ObjectRef may include any number of the referred-to object's properties. The ObjectRef operator resolves the reference and replaces itself with the object definition identified by the parameters.

The following example identifiers the iAdder block.

(ObjectRef (Block (Name 'iAdder)))

The ObjectCRef operator works like ObjectRef except that it allows access to all elements of the referenced object, not just the public elements. This is normally only used with basis and extension elements.

Type Specifier

An object type specifier can specify either a built-in type, or an object definition.

A small number of built-in types is supported for building complex objects. A built-in type is specified using the Type operator.

(Type {iBool | iInt | iFloat | iPointer})

For all other object types, the object definition is specified. Since most object definitions are defined in one place and referenced by their identifiers, the ObjectRef operator is usually used. However, if an object definition is used in only one place, it can appear "inline."

Independent of what type of object is used, a type specifier can state that the data exists either locally or remotely. A local object is one that is instantiated locally. A remote object is one that exists at another place (inside another object, for instance) and is referenced. The Pin operator can convert any type specifier to one that is remote.

Remotely accessed objects can be used in input, output, and connector elements of objects.

EXAMPLES

An integer:
(Type 'iInt)
An iAdder block, using an ObjectRef operator:
(ObjectRef (Block (Name 'iAdder)))
An iAdder block, inline:
(Block (Name 'iAdder) (Input (Name 'left) (Type 'iInt)) . . . )
An integer, accessed remotely:
(Pin (Type 'iInt))
An iAdder block, accessed remotely:
(Pin (ObjectRef (Block (Name 'iAdder))))

4. Object Syntax

Depending on the elements it contains, an object can be a simple state container that flows through a dataflow program, or it can be a block that can be connected into the program.

A state container typically contains fields and functions, whereas a block contains inputs, outputs, internal blocks, connectors, etc. Since any object can contain any elements, there is really no sharp distinction between a state container object and a block.

A block's implementation can be made up of a network of internal blocks and fields connected together, as well as an "evaluate" function that can perform computations. A block can also contain connectors, to which series connections (typically used in extension objects) can be connected.

There are alternative ways to implement a block. One way is to explicitly specify a collection of internal blocks, fields, connectors, and connections. Another way is to use a basis element and extension elements. In the latter case, the implementation of the basis object is combined with that of the extension objects, forming a new implementation.

Basis elements can also be used to implement the traditional inheritance of object properties. See the Basis section below for more information.

Object Identity

All object definitions must contain a list of unique identifiers, which, when taken together, uniquely identify the object definition. The list of unique identifiers is specified by the Identifiers property. If the Identifiers property is not present, the object is identified solely by its Name property.

```
(Object
    (Identifiers 'Name 'Author)
    (Name 'Transmogrifier)
    (Author 'Calvin)
    . . .
)
```

Interface: Inputs and Outputs

Input and output interfaces are specified by the Input and Output properties. Each has a type specifier, which states the type of data that flows into or out of the input or output.

Fields

State information is stored in fields. Each has a type specifier, which states the type of data that is stored.

The Value property specifies the initial value of the field. It is used only with the basic types (int, float, etc.) that have no built-in default values.

The Owned property only applies to fields that are objects. If set to true, the object will be managed (instantiated, deleted, etc.). By default, it is set to true.

The Reset property specifies how the field's value is to be reset. The default is Value, which means it is set to its initial value when it is reset. If set to None, nothing is done to reset its value.

Evaluate Function

The implementation of the evaluate function is specified using the Implementation property. The code can either be specified inline (using the Code property) or in a file (using the File property). If the file property is used, the name of the file is optional. If no name is specified, the name is automatically generated. If the file does not exist, it is automatically generated.

Additional code that is called by the evaluate function need not be identified in the ODL program; it only needs to be present in an accessible library at runtime.

Connectors

A connector is specified using the Connector property. Connectors can be used in blocks that are intended to be used as basis objects. The purpose of the connectors is to allow extensions to automatically connect themselves to the right place in the basis block's dataflow program.

Data flows through a connector. The connector exposes the stream of data so that extensions can tap into it. The data can be modified as it passes through the connector using series connections (see the Series section below).

Internal Blocks

Internal blocks, which make up part of an object's implementation, are specified using the Block operator. As with fields, a type specifier is required to state the type of object to use.

Functions

A function is specified using the Function operator.

In an embodiment of the invention, C++ functions are supported, and they are callable from C++ code.

A function has a name, a language, a return value, and any number of parameters. For C++ functions, the parameter order must also be specified.

The language is specified using the Language operator. In an embodiment of the invention, there is no default value, so every function must have a language property.

The return value is specified using the Return operator.

Parameters are specified using the Parameter operator. All parameters and the return value must have a type specifier in an embodiment of the invention. Parameters must be named; for C++ functions, return values do not have to be named. The parameter order can be specified using the ParameterOrder operator.

EXAMPLES

This function takes two integer parameters and returns a floating point value.

```
(Function (Name FixedToFloat) (Language C++)
  (Return (Type iFloat))
  (Parameter (Name HighBits) (Type iInt))
  (Parameter (Name LowBits) (Type iInt))
  (ParameterOrder HighBits LowBits)
  (Implementation (File)))
```

Connections

A link, or "wire," between two internal blocks or connectors is specified using the Connection property. The wire's properties (what it connects to) are specified using the From and To properties.

The From property specifies where the input end of the wire is connected. Data flows into this end of the wire. The To property specifies where the output end of the wire is connected. Data flows out of this end of the wire.

The From and To properties each specify the location of an interface element to be connected. They must be compatible with each other; i.e., they must carry same data type. In an embodiment of the invention, they each have either one or two parameters. If there is only one parameter, it identifies an interface element (input or output) or connector of the block to which the connection belongs. If there are two parameters, then they specify an interface element of an internal block; the first parameter is the internal block name and the second parameter is the interface name.

If a connector is identified in the From or To property of a connection within an extension, it should contain an extra element to specify whether it is identifying a connector in the extension or in the basis block. This is done by adding either "(basis)" or "(extension)" in the general form of the identifier. See the last example below.

EXAMPLES

This connection wires the block's Left input to the X input of internal block A:

(Connection (From 'Left) (To 'A 'X))

This connection wires the R output internal block A to the input of internal connector B:

(Connection (From 'A 'R) (To 'B))

This connection wires the RGB output of internal block C to the block's Color output:

(Connection (From 'C 'RGB) (To 'Color))

This connection exist within an extension. It wires the Sum output of the extension's internal block D to the basis block's connector C:

(Connection (From 'D 'Sum) (To ((Name 'C)(Basis))))

Series Connections

A series connection is a special type of connection that is used in conjunction with a connector.

To perform a computation on the data that flows through a connector, the computation can be specified using a series property. The computation is inserted into the flow of data at the connector such that the data flowing into the connector is processed, producing new data at the output of the connector. Using multiple series elements, any number of independent computations (i.e., computations that have no knowledge of each other) can be inserted in series at the connector.

In an embodiment of the invention, a series property contains three distinct elements:

1. A Connector element that identifies the connector where the computation is to be performed.
2. A From element that identifies a data source where the new connector data comes from.
3. Any number of To elements that specify the inputs into which the connector data is fed.

Basis

The Basis operator allows the elements of another object to be acquired. A basis element can be used for traditional inheritance of properties, or as a foundation for extension elements.

Traditional Inheritance of Properties

Since the basis operator allows an object to acquire the properties of another object, it can be used when several objects share a set of properties. The shared properties are defined in an object, and the object is used as the basis in all the objects that share the properties.

In an embodiment of the invention, it is not necessary to name the basis element. This allows the sub object to refer to the base object is elements using the same names. In order to avoid collisions, when the basis element is named, the base object's elements are given an extra identifier when they are acquired by the sub object.

In an embodiment of the invention, the use of a basis does not form an abstraction; it does not allow polymorphism. The traditional inheritance that allows polymorphism is not supported. Instead, abstractions are created through the use of block interfaces.

Foundation for Extensions

To use a basis for the purpose of extending with extension elements, the basis element must be given a name in order for the basis object's elements to avoid collisions with those of the extension objects.

Extensions

The Extension operator allows the elements of another object to be acquired and hooked up to the existing connectors. In an embodiment of the invention, if the connectors named in the extension's connection elements do not exist, an error results. The connectors are typically supplied by a basis element.

Syntax Summary

The "Block" operator can be used to define all objects.

```
Block:
(Block
 (Name {name})
 [(Input (Name {name}) {TypeSpecifier})]*
 [(Output (Name {name}) {TypeSpecifier})]*
 [(Field
      (Name {name})
      {TypeSpecifier}
      [(Value {Value})]
      [(Owned {boolean})]
      [(Reset {none | Value | Object Function})])]*
 [(Block (Name {name}) {TypeSpecifier})]*
 [(Connector (Name {name}) {TypeSpecifier})]*
 [(Function (Name {name}) (Language {language})
      [(Return {TypeSpecifier})]
          [(Parameter (Name {name}) {TypeSpecifier})]*
          [(ParameterOrder {name}*)]
          [(Implementation [(File [{fileName}]) |
 (Code [{code}]*)])]
 )
 [(Connection
      (From {OutputIdentifier})
      (To {InputIdentifier})
 )]*
 [(Series
      (Connector {ConnectorName})
      (From {OutputIdentifier})
      [(To {InputIdentifier})]*
 )]*
 [(Implementation
      {(Code [{string}]*) | (File [{FileName}])}
 )]
 [(Basis (Name {name}) {TypeSpecifier})]
 [(Extension (Name {name}) {TypeSpecifier})]*
```

-continued

```
)
 OutputIdentifier:
      {BlockName} {OutputElement} |
      {InputName} |
      {ConnectorName} | ((Name {ConnectorName}) (Basis
 | Extension))
 InputIdentifier:
      {FieldName} |
      {BlockName} {InputElement} |
      {OutputName} |
      {ConnectorName} | ((Name {ConnectorName}) (Basis
 | Extension))
```

Extension Syntax

An extension object's connections can refer to connectors in the object in which it is used, which allows it to automatically connect itself into the object. For this reason, an extension object cannot be used in isolation; the connectors it refers to must be supplied externally, usually via a basis element.

In an embodiment of the invention, if a connector is identified in the From or To property of a connection within an extension, it must contain an extra element to specify whether it is identifying a connector in the extension or in the object to which it belongs. This can be done by adding either "(basis)" or "(extension)" in the general form of the identifier.

See the example in the next section.

5. Dataflow Object Examples

Simple Blocks iAdder

Figure 19:
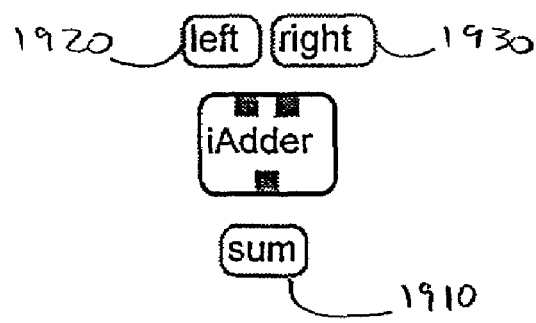
FIGS. 19 through 23 illustrate example blocks and graphs that connect them, according to the application development model, in an embodiment of the invention.

The block shown in FIG. 19 is an adder 1900, named iAdder. It is a simple block because its output 1910 is computed by an evaluate function. Two integer inputs 1920 and 1930 are added together to produce the output 1910.

The ODL code is shown below.

```
(Block
 - (Name 'iAdder)
 (Input (name 'left) (pin (type 'iInt)))
 (Input (name 'right) (pin (type 'iInt)))
 (Output (name 'sum) (pin (type 'iInt)))
 (Field (name 'sumField) (type 'iInt))
 (Connection (from 'sumField) (to 'sum))
 (Implementation (File))
)
```

The implementation of the block's evaluate function is shown below. It resides in a separate file.

_sumField =_left+_right;

Compound Blocks iAdder3

Figure 20:
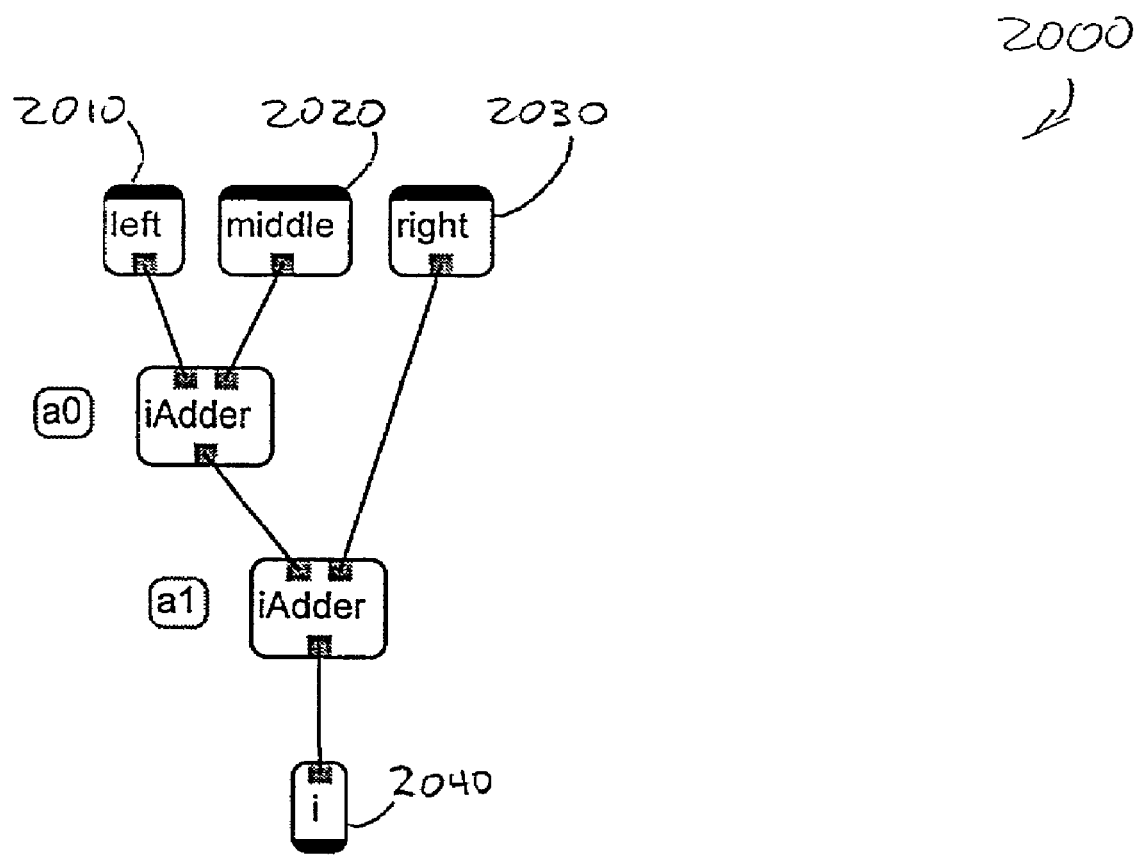

The block 2000 shown in FIG. 20 is named iAdder3. Block 2000 has three inputs 2010 through 2030. It is implemented using two iAdder blocks and produces a final output 2040.

The ODL code is shown below.

```
(Block
    (Name 'iAdder3)
    (Input (name 'left) (pin (type 'iInt)))
    (Input (name 'middle) (pin (type 'iInt)))
    (Input (name 'right) (pin (type 'iInt)))
    (Output (name 'sum) (pin (type 'iInt)))
    (Block (Name 'a0) (ObjectRef (Block (Name 'iAdder))))
    (Block (Name 'a1) (ObjectRef (Block (Name 'iAdder))))
    (Connection (From 'left) (To 'a0 'left))
    (Connection (From 'middle) (To 'a0 'right))
    (Connection (From 'right) (To 'a1 'right))
    (Connection (From 'a0 'sum) (To 'a1 'left))
    (Connection (From 'a1 'sum) (To 'sum))
)
```

Basis and Extension Objects

This example involves three different objects: a compound block that is used as a basis block, an extension object that extends the basis block, and a block that combines the two through the use of basis and extension elements.

iFormula

Figure 21:
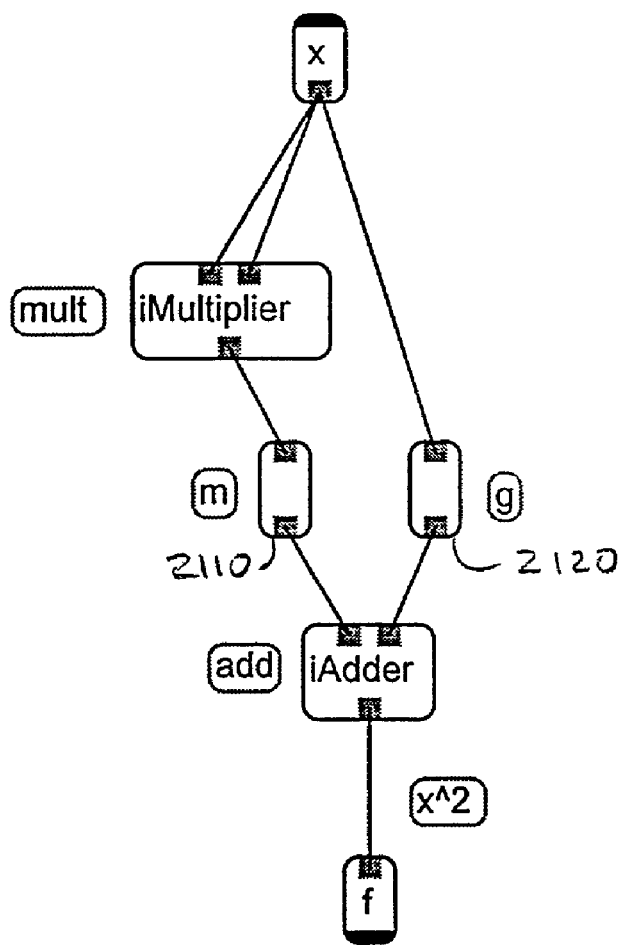

This compound block, shown in FIG. 21, contains two connectors, m and g (2110 and 2120, respectively), to which an extension can connect.

```
(Block
    (name 'iFormula)
    (Input (Name 'x) (pin (Type 'iInt)))
    (Output (Name 'f) (pin (Type 'iInt)))
    (Connector (Name 'm) (pin (Type 'iInt)))
    (Connector (Name 'g) (pin (Type 'iInt)))
    (block (name 'mult) (ObjectRef (block (name 'iMultiplier))))
    (block (name 'add) (ObjectRef (block (name 'iAdder))))
    (connection       (from 'x)
    (to 'm 'left))
    (connection       (from 'x)
    (to 'm 'right))
    (connection       (from 'x)
    (to 'g))
    (connection       (from 'm 'product) (to 'm))
    (connection       (from 'm)
    (to 'add 'left))
    (connection       (from 'g)
    (to 'add 'right))
    (connection       (from 'add 'sum) (to
'f))
)
``` iMyExtension

Figure 22:
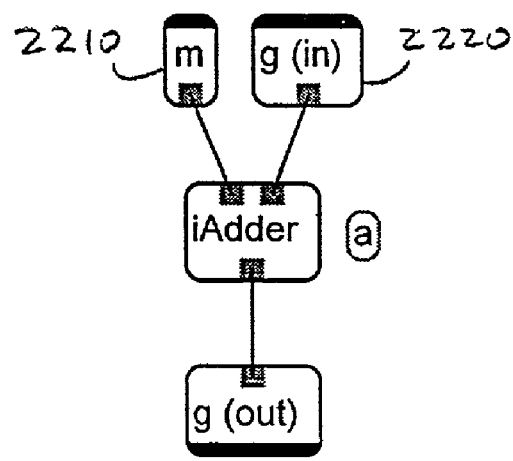

This extension's connections refer to connectors in the iFormula block, and therefore can be used to extend it. It is illustrated in FIG. 22, and contains a simple program that taps into connector m (2210) and is inserted in series with connector g (2220).

```
(extension
    (name 'iMyExtension)
    (block (name 'a) (objectRef (block (name 'iAdder))))
    (connection (from ((name 'm) (basis))) (to 'a 'left))
    (series (connector ((name 'g) (basis))) (to 'a
right) (from 'a sum))
)
``` iMyFormula

Figure 23:
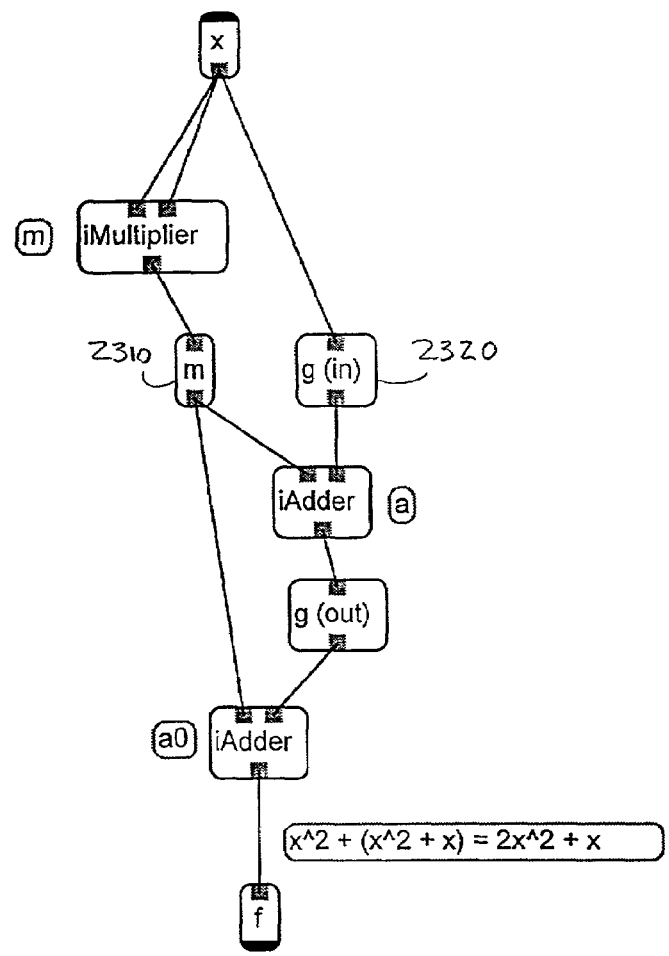

This block uses the iFormula block as a basis block, which it extends using the iMyExtension extension, as shown in FIG. 23. Element 2310 corresponds to elements 2110 and 2210 of FIGS. 21 and 22, respectively. Element 2320 corresponds to elements 2120 and 2220 of FIGS. 21 and 22, respectively.

```
(block
    (name 'iMyFormula)
    (basis (name 'b) (objectCRef (block (name 'iFormula))))
    (extension (name 'e) (objectCRef (extension (name
'iMyExtension))))
)
```

IV. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the following claims and their equivalents.

What is claimed is:

1. A computer based method of dynamically configuring the execution of an application for a particular hardware configuration comprising:

loading an application graph of the application on a hardware configuration, wherein the application graph is a directed data flow graph wherein a node of the application graph identifies a processing block and links of the application graph indicate the direction of the data flow between processing blocks, wherein the application graph is independent of hardware configurations;

loading a dictionary of components on the hardware configuration, wherein a component represents a feature, wherein a component contains at least one implementation of the feature, wherein an implementation of the feature is represented by a set of processing blocks, wherein an implementation of the feature is customized for at least one hardware configuration;

inserting at least one set of processing blocks representing an implementation of a component into the application graph, wherein the implementation is customized for the hardware configuration; and executing the application graph, wherein the application graph is dynamically modified, wherein said executing step includes:

traversing the application graph;

executing the processing blocks of the application graph, wherein executing the processing blocks specifies a necessary feature;

selecting a component from the dictionary based on the specified necessary feature;

selecting an implementation from the selected component based on the hardware configuration; and modifying the application graph dynamically at run time by inserting the set of processing blocks of the selected implementation into the application graph.

2. The computer based method of claim 1, wherein the traversing step segregates the processing blocks into threads, wherein the traversing step comprises:

mapping each processing block in the application graph to one of a plurality of phase of executions, wherein a phase of execution represents a subset of the application graph wherein all processing blocks in one phase of execution can be executed before or after the execution of another phase of execution;

mapping each phase of execution to one of a plurality of stage of executions, wherein all processing blocks in all phases of execution in a stage of execution can run on a single thread;

creating a block execution order list for each stage of execution, wherein a block execution order list indicates the order in which each processing block in a stage of execution will be executed; and assigning each stage of execution to one of a plurality of threads, wherein all the processing blocks of a stage of execution will execute on the assigned thread according to the block execution order list for the stage of execution.

3. The computer based method of claim 2, wherein said creating step comprises:

creating the block execution order list for each stage of execution by ordering the processing blocks according to the frequency in which each processing block should execute.

4. The computer based method of claim 1, wherein each implementation of a feature includes a resource negotiation information, and wherein said selecting an implementation step includes:

identifying a set of implementations in the selected component that is compatible with the hardware configuration;

identifying the resources available on the hardware configuration; and selecting the implementation from the set of implementations based on the resource negotiation information for each implementation in the set of implementations and the resources available on the hardware configuration.

5. A system for dynamically configuring the execution of an application for a particular hardware configuration comprising:

a processor; and a memory in communication with the processor, wherein the memory stores a plurality of processing instructions for directing the processor to:

load an application graph of the application on a hardware configuration, wherein the application graph is a directed data flow graph wherein a node of the application graph identifies a processing block and links of the application graph indicate the direction of the data flow between processing blocks, wherein the application graph is independent of hardware configurations;

load a dictionary of components on the hardware configuration, wherein a component represents a feature, wherein a component contains at least one implementation of the feature, wherein an implementation of the feature is represented by a set of processing blocks, wherein an implementation of the feature is customized for at least one hardware configuration;

insert at least one set of processing blocks representing an implementation of a component into the application graph, wherein the implementation is customized for the hardware configuration; and execute the application graph, wherein the application graph is dynamically modified, wherein the processing instructions for directing the processor to execute the application graph include instructions for directing the processor to:

traverse the application graph;

execute the processing blocks of the application graph, wherein executing the processing blocks specifies a necessary feature;

select a component from the dictionary based on the specified necessary feature;

select an implementation from the selected component based on the hardware configuration; and modify the application graph dynamically at run time by inserting the set of processing blocks of the selected implementation into the application graph.

6. The system of claim 5, wherein the processing instructions for directing the processor to traverse the application graph segregates the processing blocks into threads and include instructions for directing the processor to:

map each processing block in the application graph to one of a plurality of phase of executions, wherein a phase of execution represents a subset of the application graph wherein all processing blocks in one phase of execution can be executed before or after the execution of another phase of execution;

map each phase of execution to one of a plurality of stage of executions, wherein all processing blocks in all phases of execution in a stage of execution can run on a single thread;

create a block execution order list for each stage of execution, wherein a block execution order list indicates the order in which each processing block in a stage of execution will be executed; and assign each stage of execution to one of a plurality of threads, wherein all the processing blocks of a stage of execution will execute on the assigned thread according to the block execution order list for the stage of execution.

7. The system of claim 6, wherein the processing instructions for directing the processor to create a block execution order list for each stage of execution include instructions for directing the processor to:

create the block execution order list for each stage of execution by ordering the processing blocks according to the frequency in which each processing block should execute.

8. The system of claim 5, wherein each implementation of a feature includes a resource negotiation information, and wherein the processing instructions for directing the processor to select an implementation include instructions for directing the processor to:

identify a set of implementations in the selected component that is compatible with the hardware configuration;

identify the resources available on the hardware configuration; and select the implementation from the set of implementations based on the resource negotiation information for each implementation in the set of implementations and the resources available on the hardware configuration.

9. A computer program product comprising a tangible computer usable medium having control logic stored therein for causing a computer to dynamically configure the execution of an application for a particular hardware configuration, said control logic comprising:

first computer readable program code means for causing the computer to load an application graph of the application on a hardware configuration, wherein the application graph is a directed data flow graph wherein a node of the application graph identifies a processing block and links of the application graph indicate the direction of the data flow between processing blocks, wherein the application graph is independent of hardware configurations;

second computer readable program code means for causing the computer to load a dictionary of components on the hardware configuration, wherein a component represents a feature, wherein a component contains at least one implementation of the feature, wherein an implementation of the feature is represented by a set of processing blocks, wherein an implementation of the feature is customized for at least one hardware configuration;

third computer readable program code means for causing the computer to insert at least one set of processing blocks representing an implementation of a component into the application graph, wherein the implementation is customized for the hardware configuration; and fourth computer readable program code means for causing the computer to execute the application graph, wherein the application graph is dynamically modified, wherein said fourth computer readable program code means includes:

fifth computer readable program code means for causing the computer to traverse the application graph;

sixth computer readable program code means for causing the computer to execute the processing blocks of the application graph, wherein executing the processing blocks specifies a necessary feature;

seventh computer readable program code means for causing the computer to select a component from the dictionary based on the specified necessary feature;

eighth computer readable program code means for causing the computer to select an implementation from the selected component based on the hardware configuration; and ninth computer readable program code means for causing the computer to modify the application graph dynamically at run time by inserting the set of processing blocks of the selected implementation into the application graph.

10. The computer program product of claim 9, wherein the fifth computer readable program code means segregates the processing blocks into threads and comprises:

eleventh computer readable program code means for causing the computer to map each processing block in the application graph to one of a plurality of phase of executions, wherein a phase of execution represents a subset of the application graph wherein all processing blocks in one phase of execution can be executed before or after the execution of another phase of execution;

twelfth computer readable program code means for causing the computer to map each phase of execution to one of a plurality of stage of executions, wherein all processing blocks in all phases of execution in a stage of execution can run on a single thread;

thirteenth computer readable program code means for causing the computer to create a block execution order list for each stage of execution, wherein a block execution order list indicates the order in which each processing block in a stage of execution will be executed; and fourteenth computer readable program code means for causing the computer to assign each stage of execution to one of a plurality of threads, wherein all the processing blocks of a stage of execution will execute on the assigned thread according to the block execution order list for the stage of execution.

11. The computer program product of claim 10, wherein the thirteenth computer readable program code means comprises:

fifteenth computer readable program code means for causing the computer to create the block execution order list for each stage of execution by ordering the processing blocks according to the frequency in which each processing block should execute.

12. The computer program product of claim 9, wherein each implementation of a feature includes a resource negotiation information, and wherein the eighth computer readable program code means comprises:

eleventh computer readable program code means for causing the computer to identify a set of implementations in the selected component that is compatible with the hardware configuration;

twelfth eleventh computer readable program code means for causing the computer to identify the resources available on the hardware configuration; and thirteenth computer readable program code means for causing the computer to select the implementation from the set of implementations based on the resource negotiation information for each implementation in the set of implementations and the resources available on the hardware configuration.

* * * * *